US008261619B2

(12) United States Patent
Shin et al.

(10) Patent No.: US 8,261,619 B2
(45) Date of Patent: Sep. 11, 2012

(54) TIME TO DIGITAL CONVERTING CIRCUIT AND PRESSURE SENSING DEVICE USING THE SAME

(75) Inventors: Young-Ho Shin, Yongin-si (KR); Sang-Jin Lee, Yongin-si (KR); Bang-Won Lee, Yongin-si (KR)

(73) Assignee: Atlab Inc. (KR)

( * ) Notice: Subject to any disclaimer, the term of this patent is extended or adjusted under 35 U.S.C. 154(b) by 1141 days.

(21) Appl. No.: 12/094,074

(22) PCT Filed: Aug. 4, 2006

(86) PCT No.: PCT/KR2006/003069

§ 371 (c)(1), (2), (4) Date: May 16, 2008

(87) PCT Pub. No.: WO2007/061172

PCT Pub. Date: May 31, 2007

(65) Prior Publication Data

US 2008/0295603 A1 Dec. 4, 2008

(30) Foreign Application Priority Data

Nov. 28, 2005 (KR) ........................ 10-2005-0114414
Dec. 2, 2005 (KR) ........................ 10-2005-0117183

(51) Int. Cl.
*G01L 9/00* (2006.01)

(52) U.S. Cl. ................. 73/753; 73/700; 73/723; 73/724

(58) Field of Classification Search ........................ None
See application file for complete search history.

(56) References Cited

U.S. PATENT DOCUMENTS 4,912,660 A * 3/1990 Kuipers et al. .................. 702/65
6,320,911 B1 * 11/2001 Cucchi et al. ................. 375/259
6,501,706 B1 12/2002 West
7,453,255 B2 * 11/2008 Sunter et al. ............... 324/76.48

(Continued)

FOREIGN PATENT DOCUMENTS

JP 57-154937 9/1982

(Continued)

OTHER PUBLICATIONS

Japanese Office Action—Japanese Application No. 2008-542222 dated Mar. 8, 2011, citing JP2004-146099, JP11-88138, JP10-31044 and JP2005-123831.

(Continued)

*Primary Examiner* — Lisa Caputo
*Assistant Examiner* — Jermaine Jenkins
(74) *Attorney, Agent, or Firm* — Cantor Colburn LLP

(57) ABSTRACT

A time-to-digital converting circuit and a pressure sensing device using the same are provided. The circuit includes: a delay time-varying unit generating a reference signal having a fixed delay time, and a sensing signal having a variable delay time in response to an impedance of an externally applied signal; and a delay time calculation and data generation unit calculating a delay time difference between the reference signal and the sensing signal, and generating digital data having a value corresponding to the calculated delay time difference. Accordingly, the digital data are generated using the delay time varied in response to the externally applied signal, so that the size of the time-to-digital circuit is significantly reduced. In addition, an affect due to external noises is minimized.

31 Claims, 14 Drawing Sheets

U.S. PATENT DOCUMENTS

| | | | | |
|---|---|---|---|---|
| 7,558,157 | B1 * | 7/2009 | Gardner et al. | 368/10 |
| 7,804,290 | B2 * | 9/2010 | Henzler et al. | 324/76.82 |
| 7,823,446 | B2 * | 11/2010 | Nilsson et al. | 73/290 V |

FOREIGN PATENT DOCUMENTS

| | | |
|---|---|---|
| JP | 58-097919 | 10/1983 |
| JP | 08-184513 | 7/1996 |
| JP | 10-031044 | 2/1998 |
| JP | 10-260653 | 9/1998 |
| JP | 11-088138 | 3/1999 |
| JP | 11-108776 | 4/1999 |
| JP | 2000-028444 | 1/2000 |
| JP | 2000-111421 | 4/2000 |
| JP | 2004-146099 | 5/2004 |
| JP | 2005-123831 | 5/2005 |
| JP | 2006-112931 | 4/2006 |
| KR | 10-1996-0042068 | 5/1998 |
| KR | 10-0158633 | 8/1998 |
| KR | 10-2000-0075411 | 12/2000 |
| KR | 10-2001-0006217 | 1/2001 |
| KR | 10-2003-0026083 | 3/2003 |
| TW | 200467 | 2/1993 |

OTHER PUBLICATIONS

International Search Report for corresponding International Appliance No. PCT/KR2006/003069 dated Nov. 20, 2006.

Written Opinion of the International Searching Authority for corresponding International Appliance No. PCT/KR2006/003069 dated Nov. 20, 2006.

* cited by examiner

[Fig. 1]
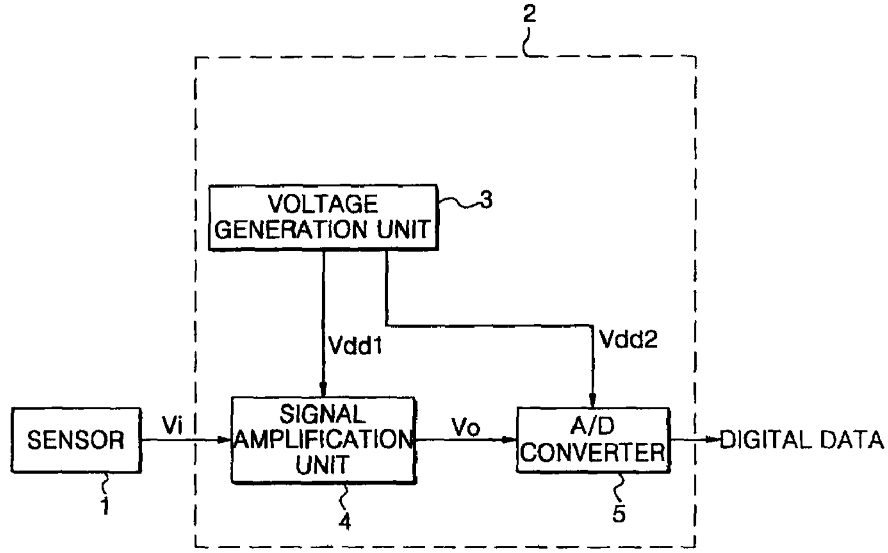
Fig.2
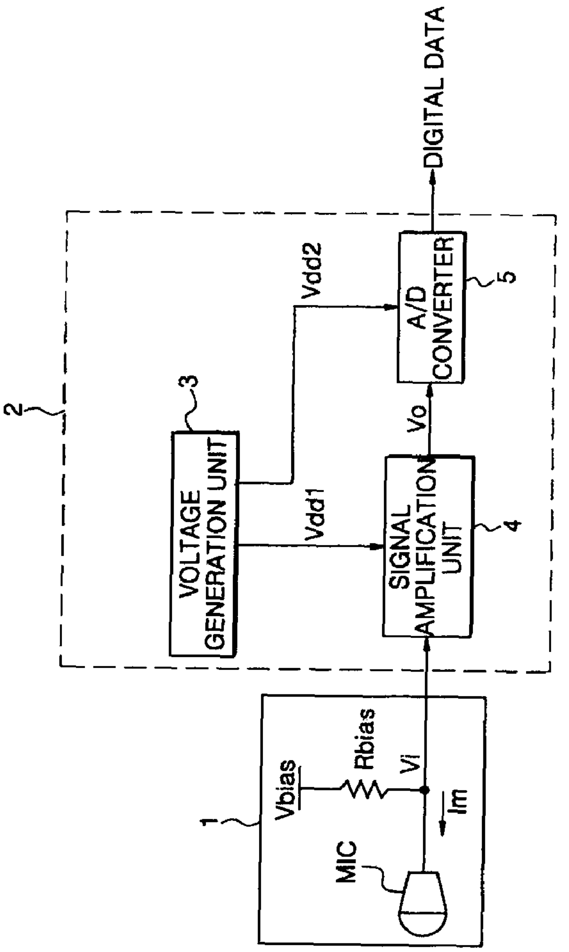

[Fig. 4]
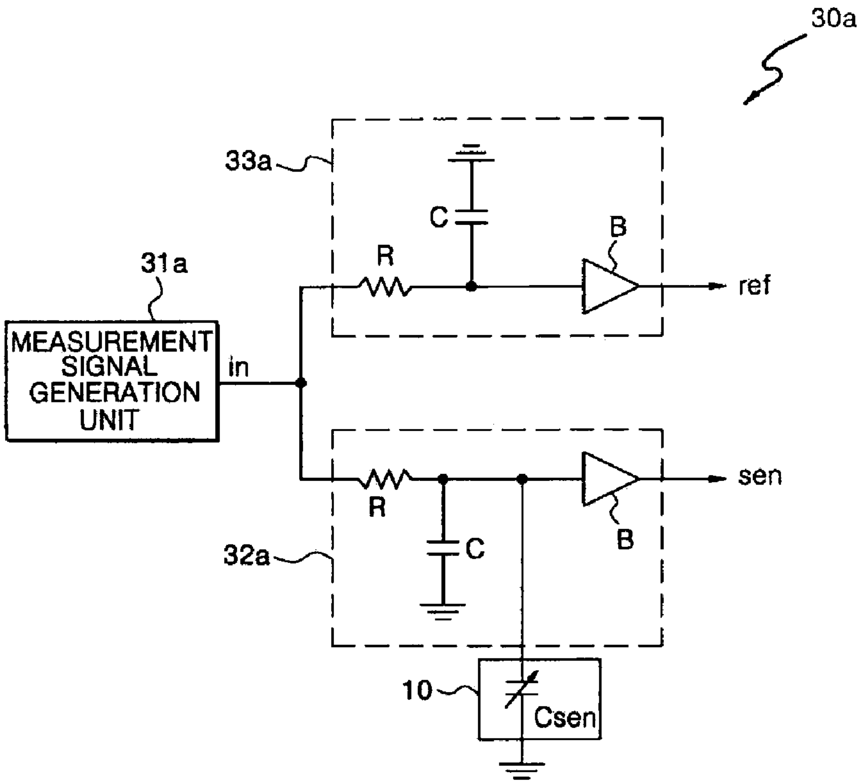
[Fig. 5]
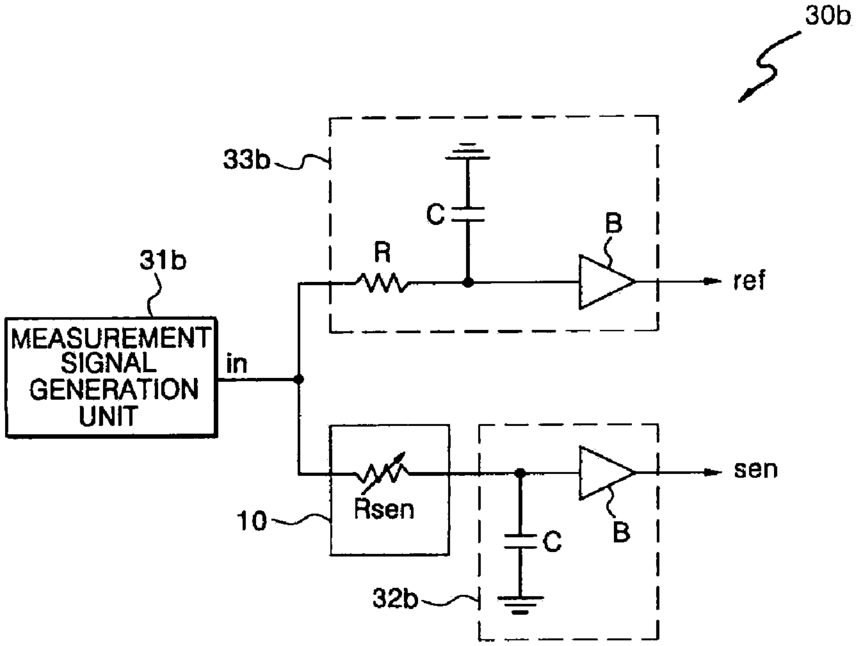

[Fig. 6]
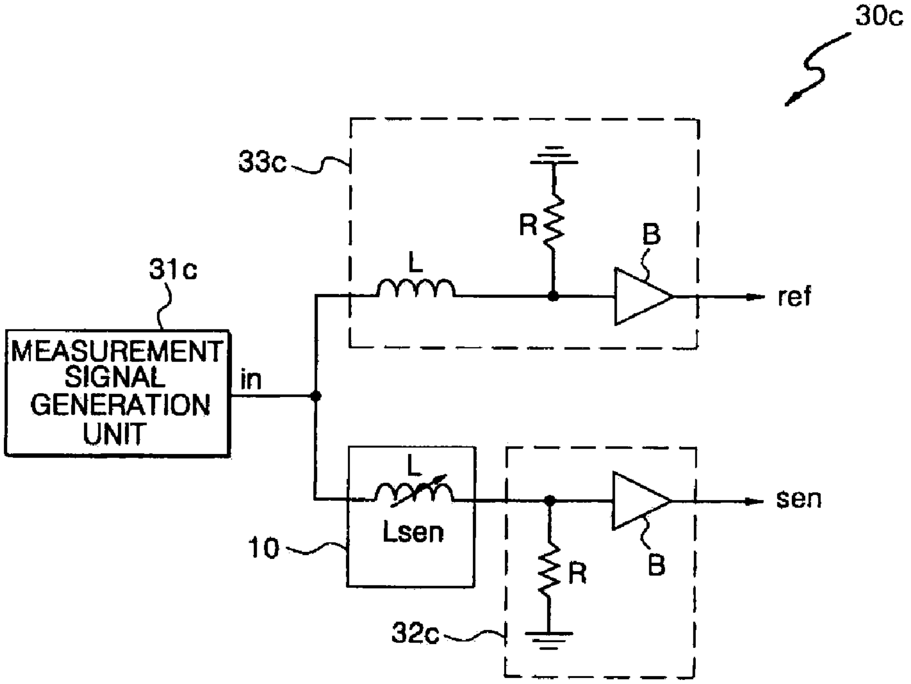
[Fig. 7]
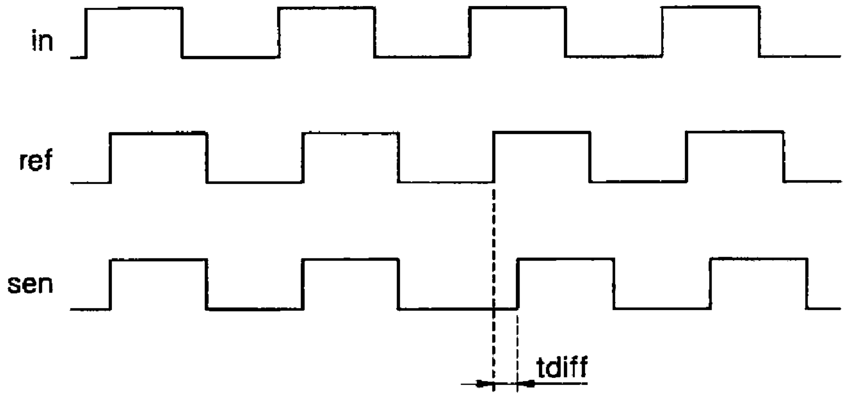

Fig.8
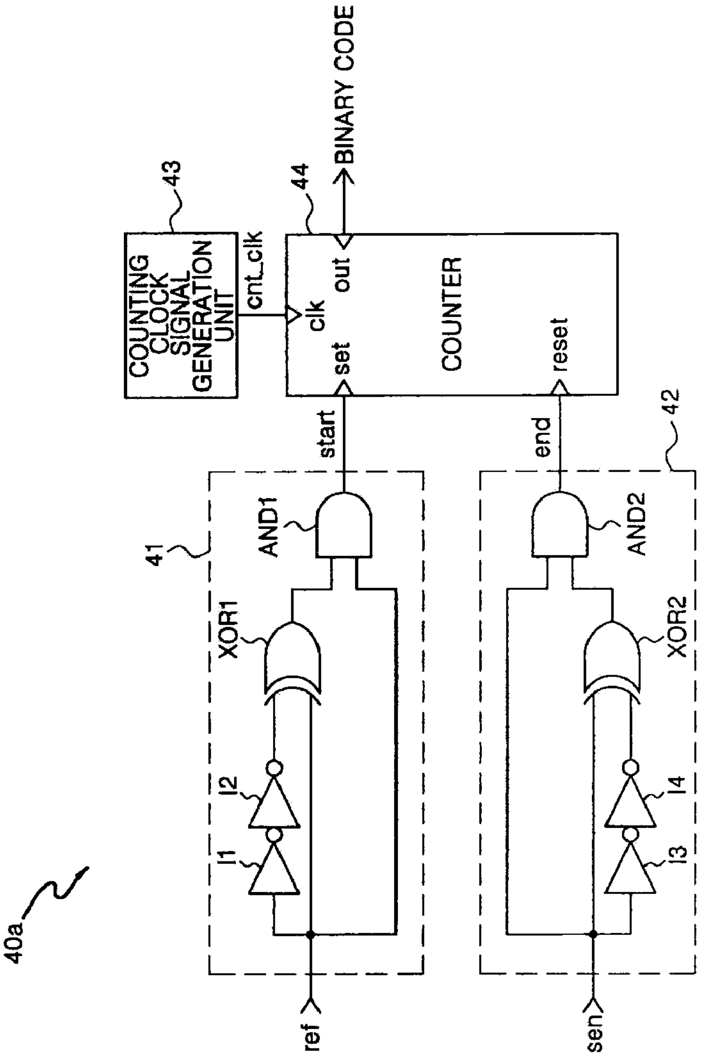
[Fig. 9]
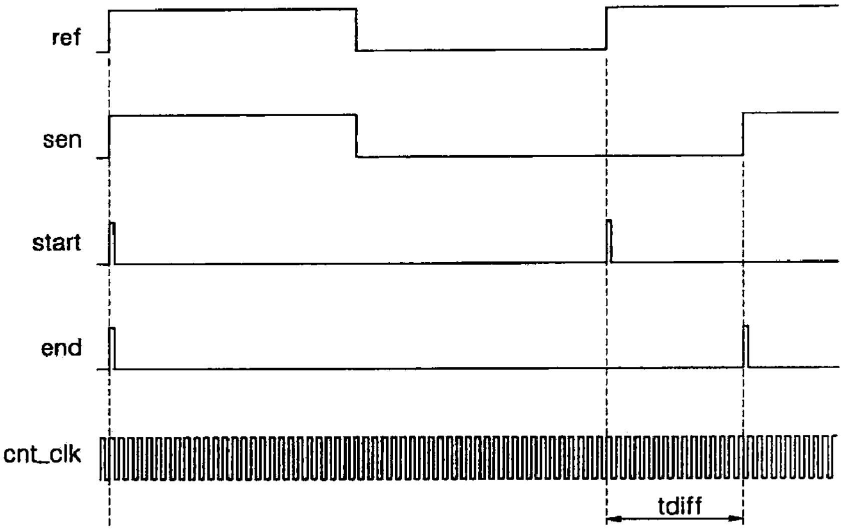

Fig.17
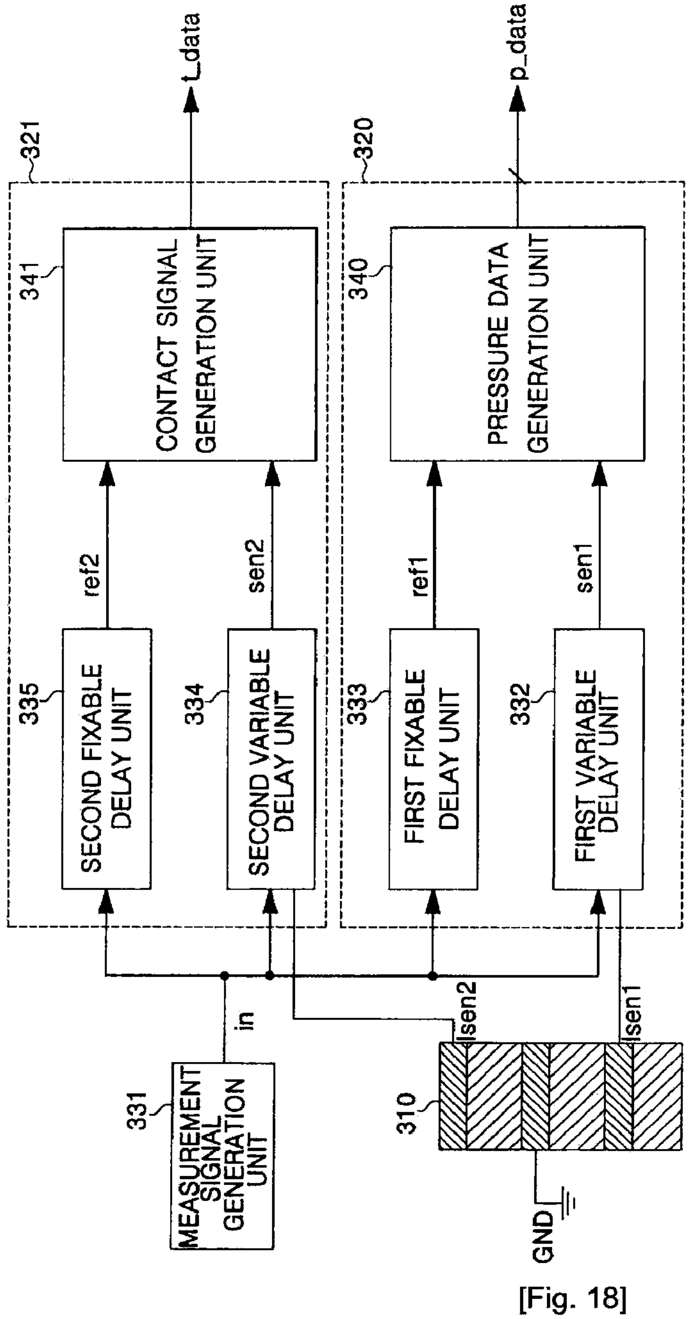
[Fig. 18]
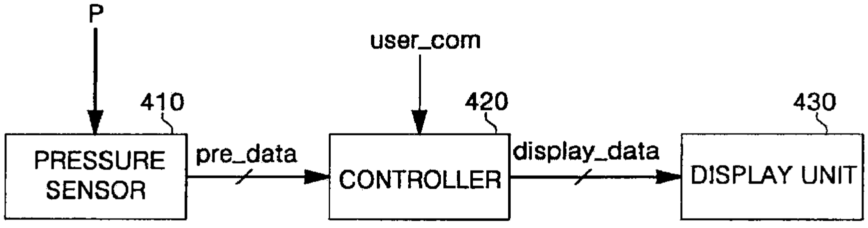

[Fig. 19]
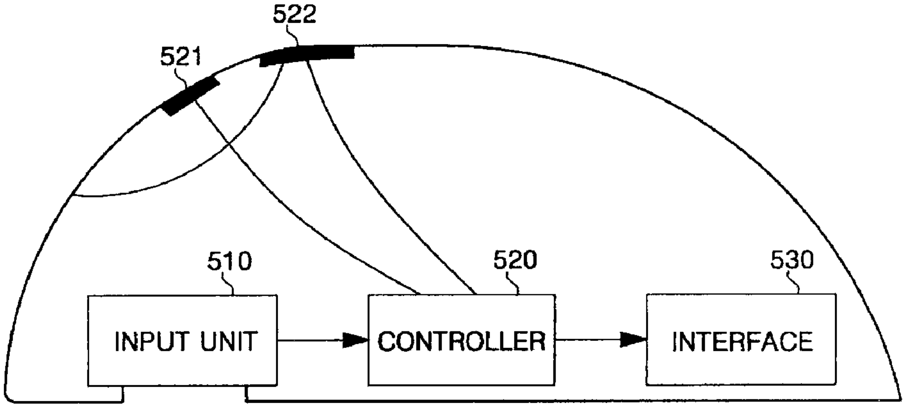
[Fig. 20]
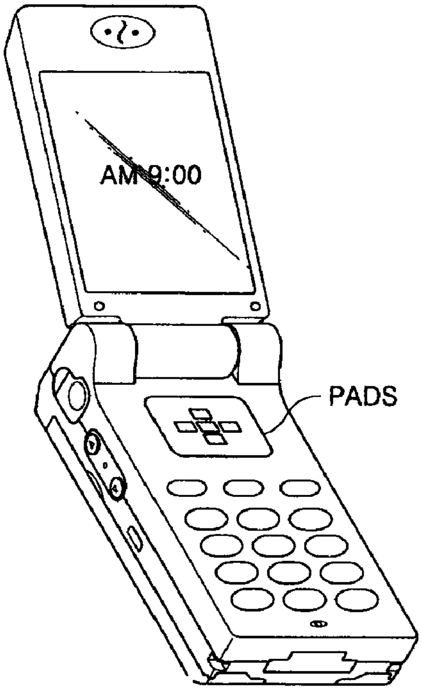
[Fig. 21]
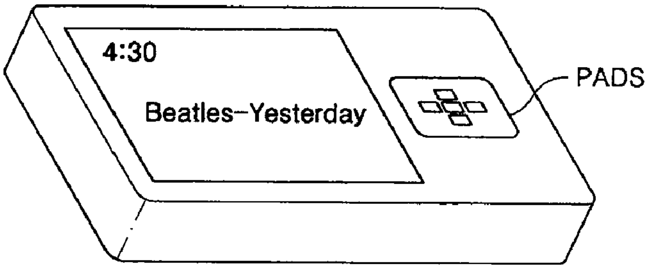

TIME TO DIGITAL CONVERTING CIRCUIT AND PRESSURE SENSING DEVICE USING THE SAME

TECHNICAL FIELD

The present invention relates to a time-to-digital converting circuit and pressure sensing device using the same, and more particularly, to a time-to-digital converting circuit and pressure sensing device using the same which varies a delay time difference between a reference signal and a sensing signal depending on external stimulus strength, and calculates the varied delay time difference to generate digital data having a value corresponding to the external stimulus strength.

BACKGROUND ART

Recently, a voltage-to-digital converting circuit is widely employed as a signal converting circuit, which receives an external voltage of which the magnitude varies to convert the voltage having the magnitude to digital data.

FIG. 1 illustrates the configuration of a conventional voltage-to-digital converting circuit. Referring to FIG. 1, the conventional voltage-to-digital converting circuit 2 includes a voltage generation unit 3, a signal amplification unit 4, and an A/D converter 5.

In this case, a sensor 1 varies the magnitude of its output voltage depending on the external stimulus strength to apply it to the voltage-to-digital converting circuit 2.

The voltage generation unit 3 receives an external voltage (not shown) to generate operating voltages Vdd1 and Vdd2 having voltage levels required for operations of the signal amplification unit 4 and the A/D converter 5.

The signal amplification unit 4 receives the operating voltage Vdd1 from the voltage generation unit 3, amplifies a voltage V1 of the sensor 1, and enables the A/D converter 5 to correctly recognize the magnitude of the amplified voltage V0.

The A/D converter 5 divides a voltage level range of the operating voltage Vdd2 supplied from the voltage generation unit 3 into predetermined units, recognizes the voltage level range corresponding to the magnitude of the output voltage V0 of the signal amplification unit 4, and generates digital data (e.g., a binary code) having a value corresponding to the recognized voltage level range.

The conventional voltage-to-digital converting circuit as described above may be connected to various sensors which vary the magnitude of the output voltage depending on the external stimulus strength to convert an electrical signal of the sensor to digital data, so that the voltage-to-digital converting circuit may be widely applied in various fields.

For example, the voltage-to-digital converting circuit of FIG. 1 may be connected to the sensor 1 which is composed of a sound pressure sensing element MIC for varying an electrostatic capacitance Csen depending on sound pressure generated by an external tone generator, and a bias resistor Rbias connected between a bias voltage Vbias and the sound pressure sensing element MIC to generate an output voltage V1 corresponding to the varied electrostatic capacitance Csen as shown in FIG. 2, so that the voltage-to-digital converting circuit may be applied as a microphone circuit.

Next, operations of the microphone circuit will be described with reference to FIG. 2.

The sound pressure sensing element MIC of the sensor 1 varies the electrostatic capacitance Csen depending on the sound pressure generated by the external tone generator. Accordingly, a current Im flowing through the sound pressure sensing element MIC varies according to a formula such as bias voltage Vbias×varied electrostatic capacitance DCsen of the sound pressure sensing element MIC, so that an input voltage V1 of the voltage-to-digital converting circuit also varies its magnitude according to a formula such as current Im×bias resistance Rbias.

The signal amplification unit 4 then amplifies the input voltage V1 of the sensor 1 by a predetermined magnitude, and the A/D converter 5 generates digital data (e.g., binary code) having a value corresponding to the voltage level of the amplified input voltage V1.

That is, in the microphone circuit of FIG. 2, the sensor 1 varies the magnitude of the voltage depending on the sound pressure of the tone generator, and the voltage-to-digital converting circuit generates digital data having the value corresponding to the voltage magnitude of the sensor 1.

As such, the conventional voltage-to-digital converting circuit performs the signal converting operation on the basis of the voltage to convert the input voltage to digital data.

However, the signal amplification unit 4 of the conventional voltage-to-digital converting circuit must be supplied from the voltage generation unit 3 with an operating voltage having a sufficient magnitude to amplify the A/D converter 5 to recognize the voltage V1 of the sensor 1. Further, the A/D converter 5 must be supplied from the voltage generation unit 3 with an operating voltage having a sufficient magnitude to correctly recognize and divide the output voltage V1 of the sensor 1.

However, the magnitude of the voltage capable of being generated by the voltage generation unit 3 is proportional to the device size and voltage generation capacity of the voltage generation unit 3, so that the voltage generation unit 3 must secure the voltage generation capacity and the size corresponding to the voltage having a sufficient magnitude and capable of being generated by the voltage generation unit 3.

As a result, when the size of the voltage-to-digital converting circuit is applied to a highly integrated System-on-the-Chip (SoC) requiring a fine process and reduced to cause the voltage generation unit 3 not to have the voltage generation capacity and the size for generating the voltage having the sufficient magnitude, the voltage generation unit 3 could not generate the voltage having the magnitude required by the voltage-to-digital converting circuit.

Accordingly, when the conventional voltage-to-digital converting circuit is applied to the highly integrated SoC, the voltage generation unit 3 may not generate the voltage having the sufficient magnitude and capacity, so that performance of the voltage-to-digital converting circuit may be rapidly degraded, and mis-operation may occur in the voltage-to-digital converting circuit in the worst case.

That is, the conventional voltage-to-digital converting circuit is implemented with an analog circuit having a relatively big size (in particular, the voltage generation circuit), so that it is difficult to apply the voltage-to-digital converting circuit to a highly integrated circuit such as the SoC. In addition, operational performance of the voltage-to-digital converting circuit is very susceptible to external noises due to the property of the analog circuit.

DISCLOSURE OF INVENTION

Technical Problem

In order to solve the foregoing and/or other problems, it is an objective of the present invention to provide a time-to-digital converting circuit, which varies a delay time difference between a reference signal and a sensing signal depending on external stimulus strength, and calculates the varied delay time difference to generate digital data having a value corresponding to the external stimulus strength so that it may have a reduced size and an enhanced external noise characteristic.

It is another object of the present invention to provide a pressure sensing device using the time-to-digital converting circuit.

Technical Solution

In one aspect, the invention is directed to a time-to-digital converting circuit including: a delay time-varying unit generating a reference signal having a programmably fixed delay time, and a sensing signal having a variable delay time in response to an impedance of an externally applied signal; and a delay time calculation and data generation unit calculating a delay time difference between the reference signal and the sensing signal, and generating digital data having a value corresponding to the calculated delay time difference.

In this case, the impedance of the externally applied signal may be one of an electrostatic capacitance, a resistance, and an inductance.

The delay time-varying unit may include: a measurement signal generation unit generating a measurement signal; a fixable delay unit delaying the measurement signal by a predetermined time to generate the reference signal; and a variable delay unit varying the delay time in response to the impedance of the externally applied signal, and delaying the measurement signal in response to the varied delay time to generate the sensing signal, and the delay time calculation and data generation unit may includes: a control signal generation unit generating a counting start signal to be clocked in response to a first state of the reference signal, and a counting end signal to be clocked in response to a first state of the sensing signal; a clock signal generation unit generating a clock signal; and a counter starting to calculate the number of the clock signals in response to the counting start signal, and generating digital data having a value corresponding to the calculated number of the clock signals in response to the counting end signal. In addition, the delay time calculation and data generation unit may include: a control signal generation unit generating a read signal to be clocked in response to a second state of the reference signal, and a reset signal to be clocked in response to a second state of the sensing signal; a delay signal generation unit delaying the reference signal by different times from each other to generate delay signals having different delay times from each other; and a digital data generation unit latching the sensing signal in response to the delayed signals, and decoding the latched sensing signals to generate digital data.

The delay time-varying unit may include: a measurement signal generation unit generating a measurement signal; a fixable delay unit delaying the measurement signal by a predetermined time to generate the reference signal; and a variable delay unit varying a delay time in response to the impedance of the externally applied signal and the digital data fed back from the delay time calculation and data generation unit, and delaying the measurement signal in response to the varied delay time to generate the sensing signal, and the delay time calculation and data generation unit may include: a latch circuit latching the sensing signal in response to the reference signal; and a counter circuit sequentially increasing and decreasing the value of the digital data while feeding the digital data back to the variable delay unit, and obtaining and outputting the value of the digital data at the time that an output signal of the latch circuit varies from a first level to a second level.

In another aspect, the invention is directed to a time-to-digital converting circuit including: a delay time-varying unit generating a reference signal having a programmably fixed delay time, and a sensing signal having a delay time in response to a voltage of an externally applied signal; and a delay time calculation and data generation unit calculating a delay time difference between the reference signal and the sensing signal, and generating digital data having a value corresponding to the calculated delay time difference.

The delay time-varying unit may include: a measurement signal generation unit generating a measurement signal; a fixable delay unit delaying the measurement signal by a predetermined time to generate the reference signal; and a variable delay unit varying a delay time in response to the voltage of the externally applied signal and the digital data fed back from the delay time calculation and data generation unit, and delaying the measurement signal in response to the varied delay time to generate the sensing signal, and the delay time calculation and data generation unit may include: a latch circuit latching the sensing signal in response to the reference signal; and a counter circuit sequentially increasing and decreasing the value of the digital data while feeding the digital data back to the variable delay unit, and obtaining and outputting the value of the digital data at the time that an output signal of the latch circuit varies from a first level to a second level.

Alternatively, the delay time-varying unit may include: a measurement signal generation unit generating a measurement signal; a fixable delay unit delaying the measurement signal by a predetermined time to generate the reference signal; and a variable delay unit varying a delay time in response to the voltage of the externally applied signal, and delaying the measurement signal in response to the varied delay time to generate the sensing signal, and the delay time calculation and data generation unit may include: a control signal generation unit generating a counting start signal to be clocked in response to a first state of the reference signal, and a counting end signal to be clocked in response to a first state of the sensing signal; a clock signal generation unit generating a clock signal; and a counter starting to calculate the number of the clock signals in response to the counting start signal, and generating digital data having a value corresponding to the calculated number of the clock signals in response to the counting end signal.

In still another aspect, the invention is directed to a pressure sensing device including: a pressure sensor having an impedance varying in response to the strength of pressure applied from the external; a delay time-varying unit generating a reference signal having a programmably fixed delay time, and a sensing signal having a delay time varying in response to the impedance of the pressure sensor; and a pressure data generation unit calculating a delay time difference between the reference signal and the sensing signal, and generating pressure data having a value corresponding to the calculated delay time difference.

In this case, the impedance of the pressure sensor may be one of an electrostatic capacitance, a resistance, and an inductance.

Advantageous Effects

According to the present invention as described above, a time-to-digital converting circuit varies a delay time of a sensing signal depending on external stimulus strength and then generates digital data in response to the varied delay time. Accordingly, the size of the time-to-digital converting circuit may be significantly reduced without requiring an analog circuit, and an affect due to external noises may also be minimized.

BRIEF DESCRIPTION OF THE DRAWINGS

The foregoing and other objects, features and advantages of the invention will be apparent from the more particular description of a preferred embodiment of the invention, as illustrated in the accompanying drawing. The drawing is not necessarily to scale, emphasis instead being placed upon illustrating the principles of the invention.

FIG. 1 illustrates the configuration of a conventional voltage-to-digital converting circuit.

FIG. 2 illustrates the configuration of a microphone circuit implemented using a conventional voltage-to-digital converting circuit.

FIGS. 4 to 6 illustrate detailed circuits of delay time-varying units in accordance with embodiments of the present invention.

FIG. 7 illustrates a signal timing diagram illustrating the operation of the delay time-varying units of FIGS. 4 to 6.

FIG. 8 illustrates a detailed circuit according to a first embodiment of a delay time calculation and data generation unit of FIG. 3.

FIG. 9 illustrates a signal timing diagram illustrating the operation of the delay time calculation and data generation unit of FIG. 8.

FIG. 17 illustrates the configuration of a contact and pressure sensing device using a time-to-digital converting circuit in accordance with yet another embodiment of the present invention.

FIGS. 18 to 21 illustrate application examples of the pressure sensing device of FIG. 16 and the contact and pressure sensing device of FIG. 17.

BEST MODE FOR CARRYING OUT THE INVENTION

Hereinafter, the time-to-digital converting circuit of the present invention will be described with reference to the accompanying drawings.

Figure 3:
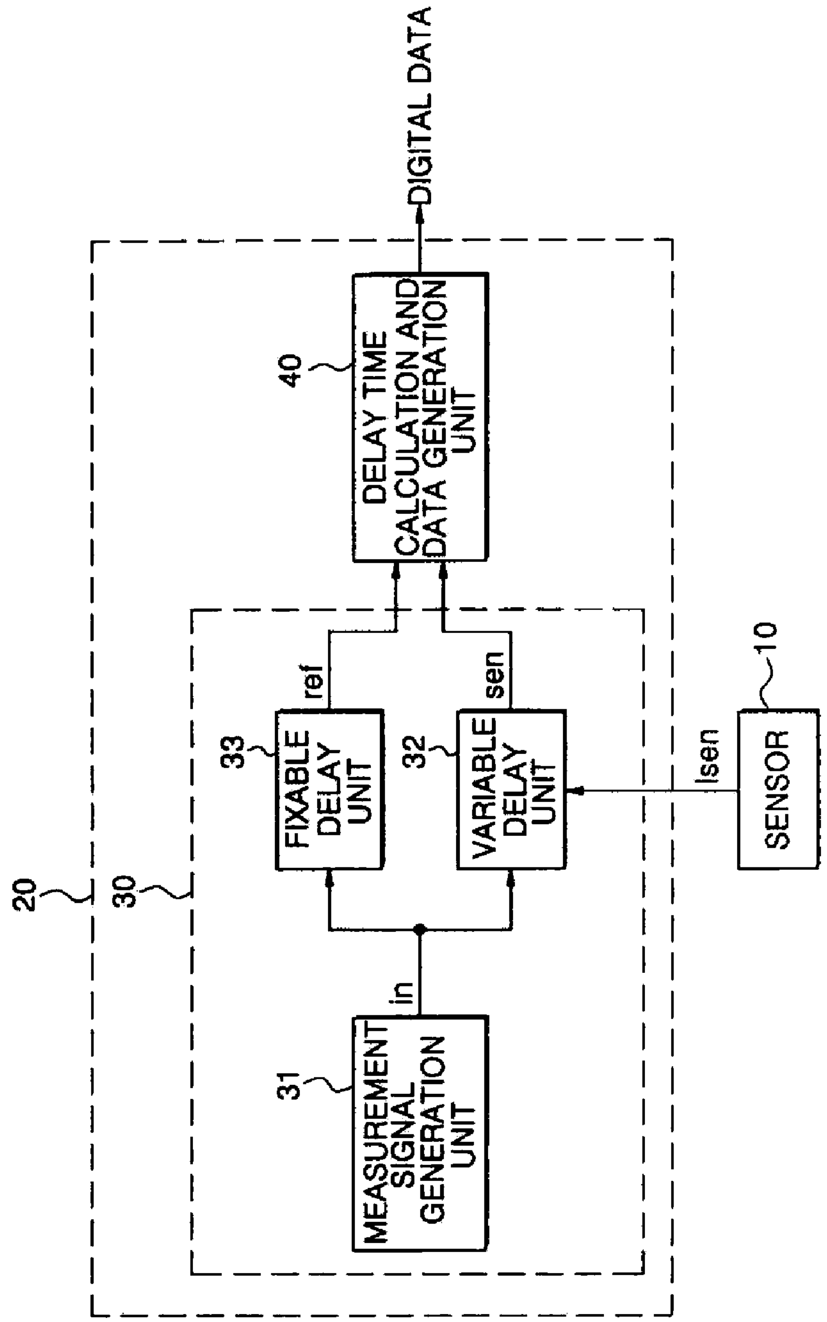
FIG. 3 illustrates the configuration of a time-to-digital converting circuit in accordance with a first embodiment of the present invention.

FIG. 3 illustrates the configuration of a time-to-digital converting circuit in accordance with a first embodiment of the present invention.

Referring to FIG. 3, the time-to-digital converting circuit includes a delay time-varying unit 30, and a delay time calculation and data generation unit 40, and the delay time-varying unit 30 has a measurement signal generation unit 31, a variable delay unit 32, and a fixable delay unit 33.

In this case, a sensor 10 varies an impedance Isen in accordance with external stimulus strength. Accordingly, any kind of elements allowing an electrostatic capacitance, an inductance, or a resistance to be varied depending on the external stimulus strength may be employed as the sensor 10.

Hereinafter, functions of respective constitutional components will be described.

The delay time-varying unit 30 generates a sensing signal sen and a reference signal ref, which have a delay time difference therebetween in proportion to an impedance Isen of the sensor 10. To this end, the measurement signal generation unit 31 generates a measurement signal to be clocked in a period of a first time, and applies it to each of the variable delay unit 32 and the fixable delay unit 33, the variable delay unit 32 is electrically connected to the sensor 10 and delays the measurement signal in in response to an inherent impedance of the variable delay unit 32 and an impedance of the sensor 10 to generate the sensing signal sen, and the fixable delay unit 33 delays the measurement signal in in response to an inherent impedance of the fixable delay unit 33 to generate the reference signal ref.

The delay time calculation and data generation unit 40 receives the reference signal ref and the sensing signal sen, calculates a delay time difference between the reference signal ref and the sensing signal sen, and generates digital data having a value corresponding to the calculated delay time difference. The digital data has a binary code format in the present invention.

FIGS. 4 to 6 illustrate detailed circuits of the delay time-varying units 30 in accordance with embodiments of the present invention.

FIG. 4 illustrates the circuit of the delay time-varying unit 30*a* connected to the sensor 10 of which an electrostatic capacitance varies depending on the external stimulus strength, FIG. 5 illustrates the circuit of the delay time-varying unit 30*b* connected to the sensor 10 of which a resistance varies depending on the external stimulus strength, and FIG. 6 illustrates the circuit of the delay time-varying unit 30*b* connected to the sensor 10 of which an inductance varies depending on the external stimulus strength.

The delay time-varying unit 30*a* of FIG. 4 will be first described.

Referring to FIG. 4, the measurement signal generation unit 31*a* is implemented as a clock generation circuit generating the clock signal to be clocked in a period of a first time, the variable delay unit 32*a* is composed of a resistor R and a buffer B serially connected between the measurement signal generation unit 31 and the delay time calculation and data generation unit 40, and a capacitor C connected between the buffer B and a ground voltage GND, and the sensor 10 is parallel connected to the capacitor C of the variable delay unit 32*a*. The fixable delay unit 33*a* is composed of a resistor R and a buffer B serially connected between the measurement signal generation unit 31*a* and the delay time calculation and data generation unit 40, and a capacitor connected between the buffer B and a ground voltage GND.

As a result, a delay time constant tsen of the variable delay unit 32*a* is R×(C+electrostatic capacitance Csen of the sensor 10), and a delay time constant tref of the fixable delay unit 33*a* is R×C, so that a delay time constant difference between the variable delay unit 32*a* and the fixable delay unit 33*a* is R×electrostatic capacitance Csen of the sensor 10.

In this case, when external stimulus is not applied to the sensor 10, an impedance of the variable delay unit 32*a* is made to match an impedance of the fixable delay unit 33*a* so as to have each of the variable delay unit 32*a* and the fixable delay unit 33*a* delay the measurement signal in by the same time as each other. That is, impedances R and C of the fixable delay unit 33*a* are made to be equal to impedances R and C of the variable delay unit 32*a* when the external stimulus is not applied to the sensor 10. Accordingly, as shown in FIG. 7, when the external stimulus is not applied to the sensor 10 so that an electrostatic capacitance of the sensor 10 is not generated, the delay time constant difference between the fixable delay unit 33*a* and the variable delay unit 32*a* becomes zero, so that the fixable delay unit 33*a* and the variable delay unit 32*a* generate the reference signal ref and the sensing signal sen which have the same delay time as each other.

In contrast, when the external stimulus is applied to the sensor 10 so that the electrostatic capacitance Csen of the sensor 10 having a value in proportion to external stimulus strength is generated, a delay time constant difference tdiff between the fixable delay unit 33*a* and the variable delay unit 32*a* becomes R×electrostatic capacitance Csen of the sensor 10, so that the variable delay unit 32*a* generates the sensing signal sen which is delayed longer than the reference signal ref of the fixable delay unit 33*a* by the delay time constant difference tdiff.

Here, we assume that resistor R and capacitor C of the fixable delay unit 33*a* are equal to resistor R and capacitor C of the variable delay unit 32*a*. But, the resistances and capacitance can be made different. By making non-equal values, the delay time constant difference tdiff has an offset value. For example, this offset value is useful to compensate tolerance of devices. When there is no external stimulus on Csen, the offset voltage is used to make no delay time difference between the reference signal ref and the sensing signal sen. For this purpose, either resistor R or capacitor C can be made to be programmably adjusted.

Next, the delay time-varying unit 30*b* of FIG. 5 will be described as follows.

Referring to FIG. 5, a measurement signal generation unit 31*b* is implemented as a clock generation circuit generating a clock signal to be clocked in a period of a first time, a variable delay unit 32*b* is composed of a buffer B connected between the measurement signal generation unit 31*b* and the delay time calculation and data generation unit 40, and a capacitor C connected between the buffer B and a ground voltage GND, and the sensor 10 is connected between the measurement signal generation unit 31*b* and the capacitor C. And a fixable delay unit 33*b* is composed of a resistor R and a buffer B serially connected between the measurement signal generation unit 31*b* and the delay time calculation and data generation unit 40, and a capacitor C connected between the buffer B and a ground voltage GND.

As a result, a delay time constant tsen of the variable delay unit 32*b* is a resistance Rsen of the sensor 10×C, and a delay time constant tref of the fixable delay unit 33*b* is R×C, so that a delay time constant difference tdiff between the variable delay unit 32*b* and the fixable delay unit 33*b* is (Rsen of the sensor 10−R)×C.

In this case, impedances between the variable delay unit 32*b*, the fixable delay unit 33*b*, and the sensor 10 are made to match each other so as to have the variable delay unit 32*b* and the fixable delay unit 33*b* delay the measurement signal by the same time as each other when external stimulus is not applied to the sensor 10. That is, impedances R and C of the fixable delay unit 33*b* is made to be equal to impedances Rsen and C of the variable delay unit 32*b* and the sensor 10 when the external stimulus is not applied to the sensor 10.

Accordingly, when the external stimulus is not applied to the sensor 10 so that the resistance Rsen of the sensor 10 is equal to the resistance R of the fixable delay unit 33 as in the described delay time-varying unit 30*a* of FIG. 4, a delay time constant difference tdiff between the fixable delay unit 33*b* and the variable delay unit 32*b* becomes zero, so that the fixable delay unit 33*b* and the variable delay unit 32*b* generate the reference signal ref and the sensing signal sen which have the same delay time as each other.

In contrast, when the external stimulus is applied to the sensor 10 to cause the resistance Rsen of the sensor 10 to increase, the delay time constant difference tdiff between the fixable delay unit 33*b* and the variable delay unit 32*b* is DRsen of the sensor 10×C, so that the variable delay unit 32*b* generates the sensing signal sen delayed longer than the reference signal ref of the fixable delay unit 33*b* by the delay time constant difference tdiff.

If the resistance Rsen is proportional to external stimulus and there is negative stimulus, then the delay time constant difference tdiff can be negative. And, for adapting various resistive sensors, resistor R in the fixable delay unit 33*b* can be programmably adjustable.

Next, a delay time-varying unit 30 of FIG. 6 will be described as follows.

Referring to FIG. 6, a measurement signal generation unit 31*c* is implemented as a clock generation circuit generating a clock signal to be clocked in a period of a first time, a variable delay unit 32*c* is composed of a buffer B connected between a measurement signal generation unit 31*c* and *a* delay time calculation and data generation unit 40, and a resistor R connected between the buffer B and a ground voltage GND, and the sensor 10 is connected between the measurement signal generation unit 31*c* and the buffer B. And a fixable delay unit 33*c* is composed of an inductor L and a buffer B serially connected between the measurement signal generation unit 31*c* and the delay time calculation and data generation unit 40, and a resistor R connected between the buffer B and a ground voltage GND.

As a result, a delay time constant tsen of the variable delay unit 32*c* is an inductance Lsen of the sensor 10/R, and a delay time constant tref of the fixable delay unit 33*c* is L/R, so that a delay time constant difference tdiff between the variable delay unit 32*c* and the fixable delay unit 33*c* is (Lsen of the sensor 10-L)/R.

In this case, impedances between the variable delay unit 32*c*, the fixable delay unit 33*c*, and the sensor 10 are made to match each other so as to have the variable delay unit 32*c* and the fixable delay unit 33*c* delay the measurement signal in by the same time as each other when an external stimulus is not applied to the sensor 10. That is, impedances L and R of the fixable delay unit 33*c* is made to be equal to impedances Lsen and R of the variable delay unit 32*c* and the sensor 10 when the external stimulus is not applied to the sensor 10.

As a result, when the external stimulus is not applied to the sensor 10 to cause the inductance Lsen of the sensor 10 to be equal to the inductance of the inductor L of the fixable delay unit 33*c* as in the described delay time-varying unit 30*a* of FIG. 4, the delay time constant difference tdiff between the fixable delay unit 33*c* and the variable delay unit 32*c* becomes zero, so that the fixable delay unit 33*c* and the variable delay unit 32*c* generate the reference signal ref and the sensing signal sen which have the same delay time as each other, respectively.

In contrast, when the external stimulus is applied to the sensor 10 to cause the inductance Lsen of the sensor 10 to increase, the delay time constant difference tdiff corresponding to the increased inductance of the sensor 10 divided by the resistance (DLsen/R) is generated between the fixable delay unit 33*c* and the variable delay unit 32*c*. Accordingly, the variable delay unit 32*c* generates the sensing signal sen delayed longer than the reference signal ref of the fixable delay unit 33*c* by the delay time constant difference tdiff.

As such, when the impedances of the sensor 10 (e.g., an electrostatic capacitance, a resistance, and an inductance) vary due to the external stimulus strength, the delay time-varying units 30*a*, 30*b*, and 30*c* according to embodiments of the present invention vary the delay time differences between the reference signal ref and the sensing signal sen in response to the varied impedances.

The present invention uses the delay time calculation and data generation unit 40 to be described below to generate digital data (e.g., a binary code) having a value corresponding to the delay time difference between the reference signal ref and the sensing signal sen.

FIG. 8 illustrates a detailed circuit according to a first embodiment of the delay time calculation and data generation unit of FIG. 3.

Referring to FIG. 8, the delay time calculation and data generation unit 40*a* has a counting start signal generation unit 41, a counting end signal generation unit 42, a counting clock signal generation unit 43, and a counting circuit 44.

The counting start signal generation unit 41 is composed of inverters I1 and I2 delaying the reference signal ref, an XOR gate XOR1 performing an XOR operation on the reference signal ref delayed by the inverters I1 and I2 and the reference signal ref which is not delayed to generate a clock to be clocked in synchronization with rising and falling edges of the reference signal ref, and an AND gate AND1 performing an AND operation on the reference signal ref and an output signal of the XOR gate XOR1 to generate a counting start signal start to be clocked in synchronization with the rising edge of the reference signal ref, and the counting end signal generation unit 42 is composed of inverters I3 and I4 delaying the sensing signal sen, an XOR gate XOR2 performing an XOR operation on the sensing signal sen delayed by the inverters I3 and I4 and the sensing signal sen which is not delayed to generate a clock to be clocked in synchronization with rising and falling edges of the sensing signal sen, and an AND gate AND2 performing an AND operation on the sensing signal sen and an output signal of the XOR gate XOR2 to generate a counting end signal end to be clocked in synchronization with the rising edge of the sensing signal sen.

In this case, the counting start signal generation unit 41 and the counting end signal generation unit 42 use the same inverters to have delay times of the signals delayed by the inverters I1, I2, I3, and I4 equal to each other.

The counting clock signal generation unit 43 is implemented as a clock generation circuit generating a counting clock signal cnt_clk to be clocked in a period of a second time, and the counting circuit 44 is implemented as a counter, which starts to count the number of the counting clock signals cnt_clk in response to the counting start signal start, and ends the counting operation in response to the counting end signal end to generate a binary code having a value corresponding to the number of the counting clock signals cnt_clk counted up to the time. In this case, the circuit configuration of the counter complies with a well-known technology, so that a detailed description thereof will be skipped herein.

In this case, the counting clock signal cnt_clk is a signal for dividing one period (e.g., the first time) of the measurement signal in into predetermined units M (M is a natural number), so that it has a period shorter than the period of the measurement signal in. Preferably, the period (e.g., a second time) of the counting clock signal cnt_clk is one period (i.e., the first time) of the measurement signal in divided by M.

Hereinafter, operations of the delay time calculation and data generation unit 40*a* of FIG. 8 will be described with reference to FIG. 9.

When the reference signal ref and the sensing signal sen having the same delay time as each other are applied to the delay time calculation and data generation unit 40*a*, the counting start signal start of the counting start signal generation unit 41 and the counting end signal end of the counting end signal generation unit 42 are simultaneously clocked.

The counting circuit 44 cannot count the number of the generated counting clock signals cnt_clk due to the counting start signal start and the counting end signal end which are simultaneously clocked, so that it generates and outputs a binary code having a value of 0.

In contrast, when the reference signal ref and the sensing signal sen having a delay time difference tdiff between each other are applied to the delay time calculation and data generation unit 40*a*, the counting start signal start of the counting start signal generation unit 41 is first clocked, and the counting end signal end of the counting end signal generation unit 42 is clocked after a time corresponding to the delay time difference tdiff passes.

Accordingly, the counting circuit 44 starts to calculate the number of the counting clock signals cnt_clk in response to the counting start signal start, and ends counting of the counting clock signals cnt_clk in response to the counting end signal end to generate and output a binary code having a value corresponding to the number of the counting clock signals cnt_clk counted up to the time.

For example, when the counting circuit 44 is a circuit generating a binary code of three bits (M=3) and the calculated number of the counting clock signals is four, the counting circuit 44 generates and outputs the binary code of 100.

As such, the delay time calculation and data generation unit 40*a* determines the generated times of the counting start signal start and the counting end signal end in response to the delay time difference tdiff between the reference signal ref and the sensing signal sen, so that it allows the counting circuit 44 to count the delay time difference tdiff between the reference signal ref and the sensing signal sen.

Here, we assume that every device is perfectly matched. But, it is natural to have a small delay time difference at no external stimulus. To compensate device mismatches and to adapt various sensor, making either fixable delay unit or variable delay unit programmable is useful.

Figure 10:
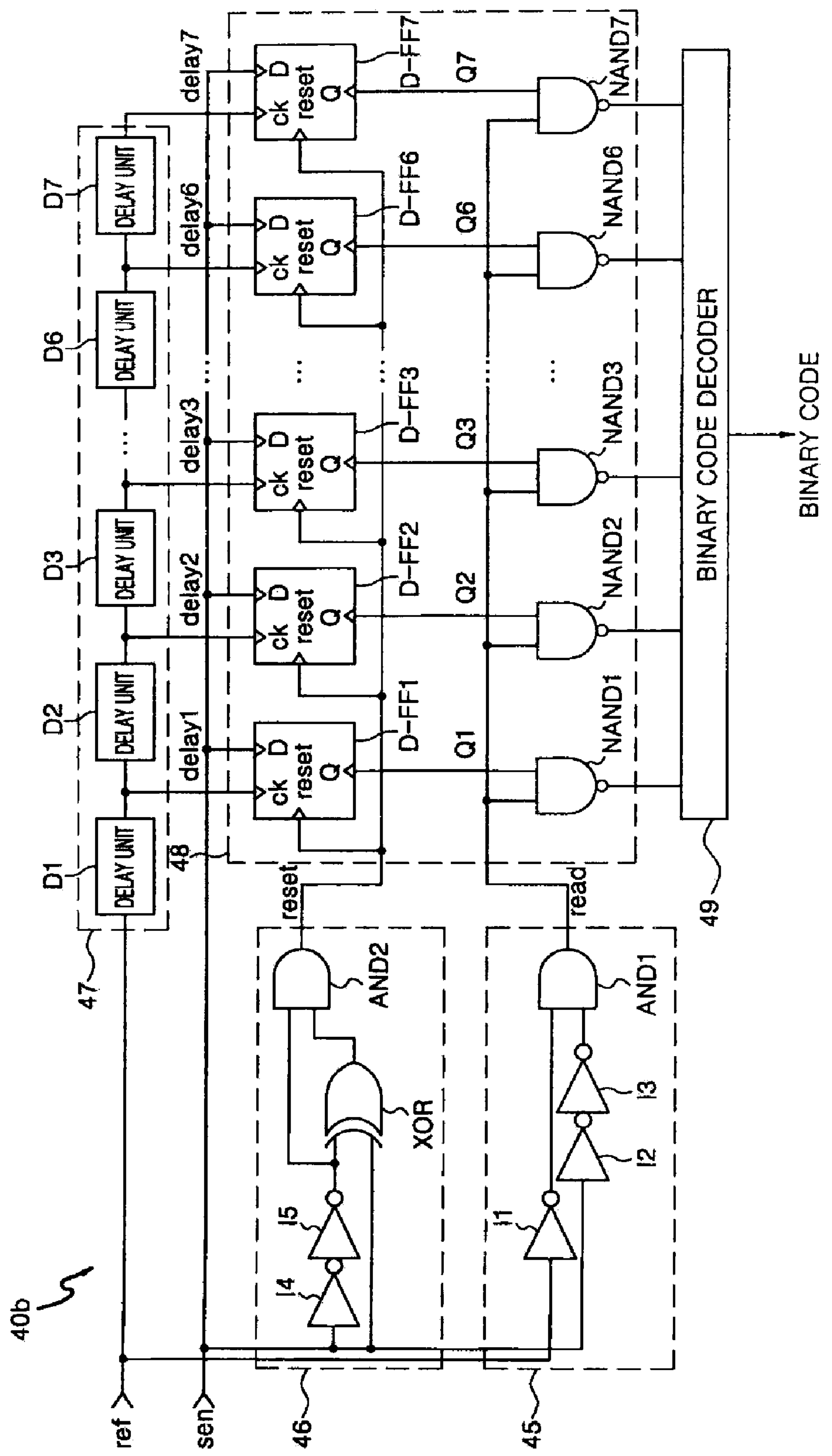
FIG. 10 illustrates a detailed circuit according to a second embodiment of the delay time calculation and data generation unit of FIG. 3.

FIG. 10 illustrates a detailed circuit according to a second embodiment of the delay time calculation and data generation unit of FIG. 3.

Referring to FIG. 10, a delay time calculation and data generation unit 40*b* has a read signal generation unit 45, a reset signal generation unit 46, a delay signal generation unit 47, a thermometer code generation unit 48, and a binary code decoder 49.

The read signal generation unit 45 is composed of an inverter I1 inverting and delaying the reference signal ref, inverters I2 and I3 delaying the sensing signal sen, and an AND gate AND1 performing an AND operation on the inverted and delayed reference signal ref and the delayed sensing signal sen to generate a read signal read to be clocked in synchronization with a rising edge of the inverted and delayed reference signal ref, and the reset signal generation unit 46 is composed of inverters I4 and I5 delaying the sensing signal sen, an XOR gate XOR performing an XOR operation on the delayed sensing signal and a sensing signal which is not delayed to generate a signal to be clocked in synchronization with rising and falling edges of the sensing signal sen, and an AND gate AND2 performing an AND operation on an output signal of the XOR gate XOR and the delayed sensing signal sen to generate a reset signal reset to be clocked in synchronization with the falling edge of the delayed sensing signal sen.

In this case, the read signal read is generated through an AND gate AND1 and an even number of the inverters I2 and I3 whereas the reset signal reset is generated through an even number of inverters I4 and I5, the XOR gate XOR, and the AND gate AND2, so that the read signal is clocked prior to the reset signal reset. That is, the reset signal reset is generated through one more logic gate XOR than the read signal read, so that the read signal read is clocked prior to the reset signal reset.

A delay signal generation unit 47 is composed of a plurality of delay units D1 to D7 which are serially connected to each other and delay the reference signal ref to generate respective delay signals delay1 to delay7, the thermometer code generation unit 48 is composed of a plurality of D Flip-Flops D-FF1 to D-FF7 which latch the sensing signal sen in response to the delay signals delay1 to delay7 to generate respective output signals Q1 to Q7 and are reset by the reset signal reset, and a plurality of NAND gates NAND1 to NAND7 which perform NAND operations on output signals Q1 to Q7 of the D Flip-Flops D-FF1 to D-FF7 and the read signal read to generate a thermometer code, and a binary code decoder 49 is implemented as a binary code decoder which converts the thermometer code to the binary code. In this case, the circuit configuration of the binary code decoder which converts the thermometer code to the binary code complies with a well-known technology, so that a detailed description thereof will be skipped herein.

Figure 11:
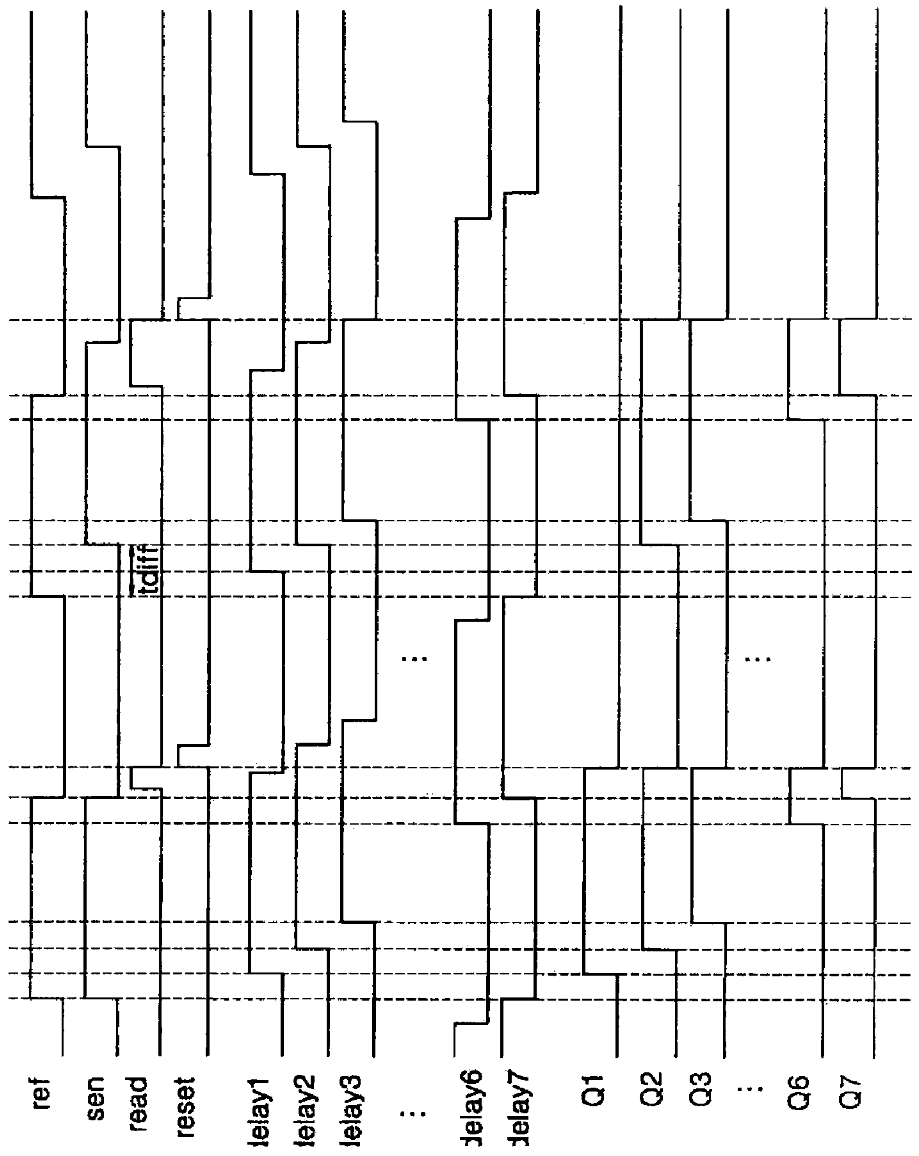
FIG. 11 illustrates a signal timing diagram illustrating the operation of the delay time calculation and data generation unit of FIG. 10.

Hereinafter, operations of the delay time calculation and data generation unit 40*b* of FIG. 10 will be described with reference to FIG. 11.

The delay time calculation and data generation unit 40*b*, upon receipt of the reference signal ref and the sensing signal sen having the same delay time as each other, operates as follows.

The delay signal generation unit 47 delays the reference signal ref through the delay units D1 to D7 to generate delay signals delay1 to delay7 having different delay times from each other, and all of the D-Flip Flops D-FF1 to D-FF7 latch the sensing signal sen having a high level in synchronization with rising edges of the respective delay signals delay1 to delay7 to generate output signals Q1 to Q7 each having a high level.

When the read signal read is clocked after a predetermined time passes, the NAND gates NAND1 to NAND7 perform NAND operations on the read signal read and the output signals Q1 to Q7 to generate a thermometer code having a value of 0000000. Accordingly, the binary code decoder 49 receives the thermometer code having the value of 0000000, and converts the received thermometer code to the binary code 000 in accordance with the table 1 below and outputs the binary code.

However, when the reference signal ref and the sensing signal sen having a delay time difference therebetween are applied to the delay time calculation and data generation unit 40*b*, some D Flip-Flops D-FF1 receive the delay signals delay1 each having a delay time shorter than the delay time of the sensing signal sen, and the rest D Flip-Flops D-FF2 to D-FF7 receive the delay signals delay2 to delay7 each having a delay time longer than the delay time of the sensing signal sen.

Accordingly, the some D Flip-Flops D-FF1 latch the sensing signal sen each having a low level to generate signals Q1 each having a low level, and the rest D Flip-Flops D-FF2 to D-FF7 latch the sensing signal sen having a high level to generate signals Q2 to Q7 each having a high level as in the described delay signal generation unit.

When the read signal read is clocked after a predetermined time passes, the NAND gates NAND1 to NAND7 generate a thermometer code of 1000000 in response to the output signals Q1 to Q7 of the D Flip-Flops D-FF1 to D-FF7. That is, it generates the thermometer code of 1000000 which is a value corresponding to the delay time difference between the reference signal ref and the sensing signal sen.

The binary code decoder 49 receives the thermometer code of 1000000 which is a value corresponding to the delay time difference, and converts the thermometer code to a binary code 001 in accordance with the table 1 below and outputs the binary code.

TABLE 1

| Q1 | Q2 | Q3 | Q4 | Q5 | Q6 | Q7 | binary code |
|---|---|---|---|---|---|---|---|
| 0 | 0 | 0 | 0 | 0 | 0 | 0 | 000 |
| 1 | 0 | 0 | 0 | 0 | 0 | 0 | 001 |
| 1 | 1 | 0 | 0 | 0 | 0 | 0 | 010 |
| 1 | 1 | 1 | 0 | 0 | 0 | 0 | 011 |
| 1 | 1 | 1 | 1 | 0 | 0 | 0 | 100 |
| 1 | 1 | 1 | 1 | 1 | 0 | 0 | 101 |
| 1 | 1 | 1 | 1 | 1 | 1 | 0 | 110 |
| 1 | 1 | 1 | 1 | 1 | 1 | 1 | 111 |

As such, the delay time calculation data generation unit 40*b* makes the D Flip-Flops D-FF1 to D-FF7 have sensing signals with different levels from each other in response to the delay time difference tdiff between the reference signal ref and the sensing signal sen so that it can calculate the delay time difference tdiff.

The time-to-digital converting circuit capable of being connected to various sensors varying the impedance depending on the external stimulus strength has been described above, and a time-to-digital converting circuit capable of being connected to various sensors varying the magnitude of the voltage depending on the external stimulus strength will be hereinafter described.

Figure 12:
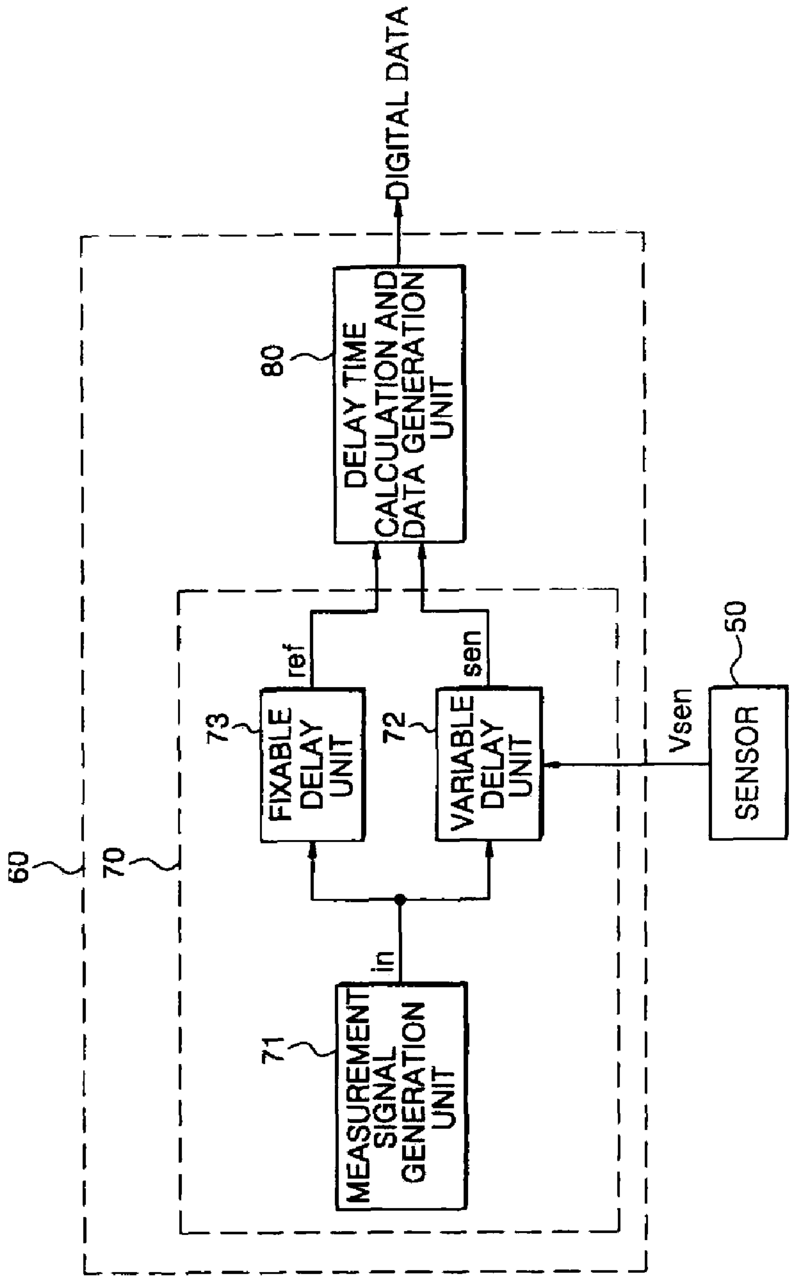
FIG. 12 illustrates the configuration of a time-to-digital converting circuit in accordance with a second embodiment of the present invention.

FIG. 12 illustrates the configuration of a time-to-digital converting circuit in accordance with a second embodiment of the present invention.

Referring to FIG. 12, a time-to-digital converting circuit 60 has a delay time-varying unit 70 and a delay time calculation and data generation unit 80, and the delay time-varying unit 70 has a measurement signal generation unit 71, a variable delay unit 72, and a fixable delay unit 73. And the sensor 50 is a sensor of which the magnitude of the voltage varies depending on the external stimulus strength as in the described conventional sensor 1.

Hereinafter, functions of the respective constitutional components will be described.

The delay time-varying unit 70 varies a delay time difference between the reference signal ref and the sensing signal sen depending on the magnitude of the voltage output from the voltage output type sensor 50 and digital data fed back from the delay time calculation and data generation unit 80.

Here, the digital data fed back are useful to program either variable delay unit 72 or fixable delay unit 73. If the delay time difference is beyond range of the delay time calculation and data generation unit 80, then either variable delay unit 72 or fixable delay unit 73 is programmed to provide an offset delay time. For example, a large external stimulus generates too large delay time difference to cover the delay time calculation and data generation unit. Then, the fixable delay unit is programmed to add a large offset delay value. The offset delay can be made by switching resistor R in unit 33*a* of FIG. 4 into a larger resistor or by adding digital delay cell like D1 in FIG. 10.

To this end, the measurement signal generation unit 71 generates a measurement signal in clocked in a period of a first time to apply it each of the variable delay unit 72 and the fixable delay unit 73, the variable delay unit 72 is electrically connected to the voltage output type sensor 50, varies the delay component depending on the magnitude of the voltage output from the voltage output type sensor 50 and the digital data fed back from the delay time calculation and data generation unit 80, and delays the measurement signal in in response to the varied delay component to generate the sensing signal sen, and the fixable delay unit 73 delays the measurement signal in in response to the fixed delay component to generate the reference signal ref.

It is also natural that the digital data fed back from the delay time calulaction and data generation unit 80 can be used to program the fixable delay unit 73.

The delay time calculation and data generation unit 80 sequentially increases or decreases the value of the digital data to adjust the delay component of the variable delay unit 72, and obtains and outputs the digital data when the delay time of the reference signal ref becomes equal to the delay time of the sensing signal sen. The feedback of FIG. 12 allows an output of the delay time calculation and data generation unit 80 to be fed back to the variable delay unit 72, so that a time for generating the digital data may be reduced. This is utilized in a delta modulator which subtracts a value of the previously input signal from a value of the currently input signal to calculate an increased value (or decreased value), so that a detailed description thereof will be skipped herein.

It is also clear that a circuit calculating the delay time difference between the reference signal ref and the sensing signal sen by means of the magnitude of the voltage of the voltage output type sensor 50 may be replaced by the delay time calculation and data generation unit of FIG. 8 or FIG. 10.

Figure 13:
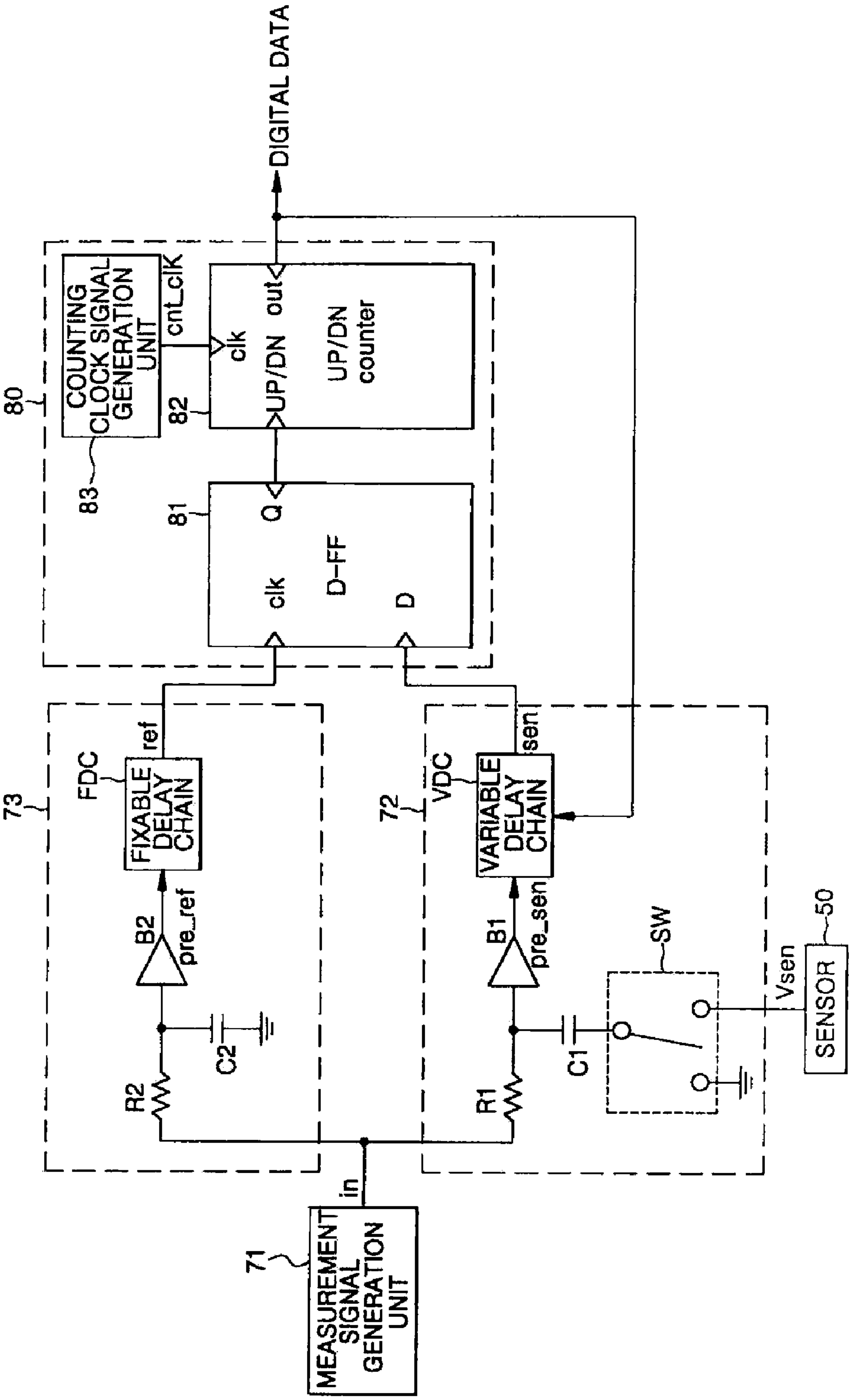
FIG. 13 illustrates a detailed circuit according to a second embodiment of the time-to-digital converting circuit of FIG. 12.

FIG. 13 illustrates a detailed circuit according to a first embodiment of the time-to-digital converting circuit of FIG. 12.

Referring to FIG. 13, the measurement signal generation unit 71 is implemented as a clock generation circuit generating a clock signal to be clocked in a period of a first time, and the variable delay unit 72 is composed of a resistor R1, a buffer B1, and a variable delay chain VDC which are serially connected between the measurement signal generation unit 71 and the delay time calculation and data generation unit 80, and a capacitor C1 and a switch SW which are serially connected between the buffer B1 and the voltage output type sensor 50. In this case, the variable delay chain VDC is composed of delay elements (not shown) which are serially connected to each other and of which operations are determined by the digital data of the delay time calculation and data generation unit 80, and the switch SW determines whether the sensor 50 must be connected to the capacitor C1 in response to a voltage level of the output signal of the buffer B2 of the fixable delay unit 73. The fixable delay unit 73 is composed of a resistor R2, a buffer B2, and a fixable delay chain FDC which are serially connected between the measurement signal generation unit 71 and the delay time calculation and data generation unit 80, and a capacitor C2 connected between the buffer B2 and a ground voltage GND.

Preferably, when the output signal of the sensor 50 is not applied to the first capacitor C1, values of the respective resistors and capacitors are set to cause the delay time due to the first resistor R1 and the first capacitor C1 to be different from the delay time due to the second resistor R2 and the second capacitor C2. This is for the sake of sensing an output voltage Vsen of the sensor 50 in a stable manner, so that the first and second capacitors C1 and C2 have the same electrostatic capacitances and the first resistor R1 has a resistance higher than the second resistor R2 to cause the delay time due to the first resistor R1 and the first capacitor C1 to be longer than the delay time due to the second resistor R2 and the second capacitor C2 in FIG. 13.

Alternatively, the delay component of the fixable delay chain FDC may be set to be different from a minimum delay component of the variable delay chain VDC to obtain the above-described effect if necessary. In this case, the minimum delay component of the variable delay chain VDC means the basic delay component of the variable delay chain VDC regardless of the value of the digital data to be fed back.

The delay component of the fixable delay chain FDC is set by an external control device (not shown) at the time of initially supplying a power or if necessary, and acts to compensate for an offset voltage when the offset voltage of the voltage output type sensor 50 occurs or acts to adjust a zero point of the digital data.

The delay time calculation and data generation unit 80 is composed of a D Flip-Flop 81 latching the sensing signal sen of the variable delay unit 72 in response to the reference signal ref of the fixable delay unit 73 to generate an output signal Q, an up-down counter 82 decreasing or increasing an output value of the digital data in response to the output of the D Flip-Flop 81, and a counting clock signal generation unit 83 generating a counting clock signal cnt_clk to be clocked in a period of a second time.

Figure 14:
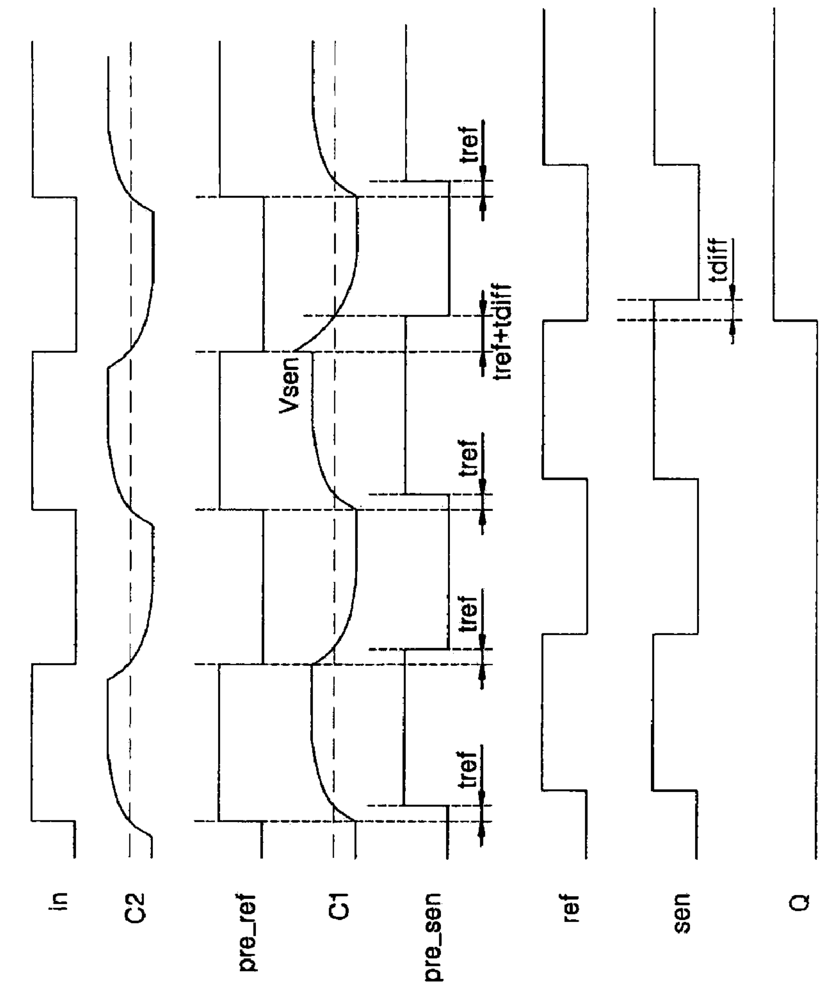
FIG. 14 illustrates a signal timing diagram illustrating the operation of the time-to-digital converting circuit of FIG. 13.

Hereinafter, operations of the time-to-digital converting circuit 60 of FIG. 13 will be described with reference to FIG. 14.

The first and second capacitors C1 and C2 perform charge and discharge operations in response to the voltage level of the measurement signal in to be transmitted through the first and second resistors R1 and R2.

The first resistor R1 has a resistance higher than the second resistor R2, so that a time for initiating the charge and discharge operations of the second capacitor C2 is basically faster than a time for initiating the charge and discharge operations of the first capacitor C1, which thus allows a signal transition time of a pre-reference signal pre_ref to be faster than a signal transition time of a pre-sensing signal pre_sen.

In this case, a delay time difference between the pre-reference signal pre_ref and the pre-sensing signal pre_sen which basically occurs due to the resistance difference between the first and second resistors R1 and R2, is referred to as a reference delay time difference tref.

The time-to-digital converting circuit 60 operates in response to the output voltage Vsen of the voltage output type sensor 50 as follows.

When the measurement signal in transitions from a low level to a high level, the second capacitor C2 first starts to carry out the charge operation, and then the first capacitor C1 starts to carry out the charge operation. Accordingly, when a time corresponding to the reference delay time difference tref passes after the second buffer B2 generates the pre-reference signal pre_ref transited from a low level to a high level, the first buffer B1 also generates the pre-sensing signal pre_sen transited from a low level to a high level.

When the measurement signal in transitions from a high level to a low level again, the second capacitor C2 first starts to carry out the discharge operation again, and then the first capacitor C1 starts to carry out the discharge operation. Accordingly, when the second buffer B2 first generates the pre-reference signal pre_ref transited from a high level to a low level, the switch SW allows the first capacitor C1 and the sensor 50 to be connected to each other, so that the output voltage Vsen of the sensor 50 is further input to the first capacitor C1.

As a result, the discharge time of the first capacitor C1 is delayed, and the time for which the pre-sensing signal pre_sen of the first buffer B1 transitions from a high level to a low level is also delayed.

When the external stimulus is not applied to the sensor 50 to cause the sensor 50 not to generate the output voltage Vsen, the first capacitor C1 does not charge the output voltage Vsen of the sensor 50 any more, so that the first buffer B1 generates the pre-sensing signal pre_sen which transitions from a high level to a low level after a time corresponding to the reference delay time difference tref passes.

In contrast, when the external stimulus is applied to the sensor 50 to cause the sensor 50 generate the output voltage Vsen corresponding to the strength of the external stimulus, the first capacitor C1 charges more output voltage Vsen of the sensor 50. Accordingly, the first buffer B1 generates the pre-sensing signal pre_sen which transitions from a high level to a low level after a time corresponding to the reference delay time difference tref and the variable delay time difference tdiff passes.

In this case, the variable delay time difference tdiff means a delay time difference between the pre-reference signal pre_ref and the pre-sensing signal pre_sen which are generated by charging more output voltage Vsen of the sensor 50. And the fixable delay chain FDC and the variable delay chain VDC compensate for the reference delay time difference tref between the pre-reference signal pre_ref and the pre-sensing signal pre_sen to generate the reference signal ref and the sensing signal sen with the variable delay time difference tdiff being applied therebetween, which transition from a high level to a low level.

The D Flip-Flop 81 latches the sensing signal sen in synchronization with a falling edge of the reference signal ref, and the up-down counter 82 obtains and outputs the digital data value at the time that the signal having a high level starts to be generated while sequentially decreasing the digital data value when the output signal of the D Flip-Flop 81 has a high level, and obtains and outputs the digital data value at the time that the signal having a high level starts to be generated while sequentially increasing the digital data value when the output signal of the D Flip-Flop 81 has a low level.

As such, referring to FIG. 13, when the output voltage of the voltage output type sensor 50 varies depending on the external stimulus strength, the time-to-digital converting circuit 60 senses the variation to vary the variable delay time difference tdiff, and then varies the digital data value of the up-down counter 82 while feeding the varied digital data value back to the variable delay chain VDC to calculate the time delay difference tdiff between the sensing signal sen and the reference signal ref.

Referring to FIG. 13 illustrated as an example, when the output voltage of the voltage output type sensor 50 is constant, an output of the D Flip-Flop 81 varies between 1 and 0 per pulse of the measurement signal in depending on the time delay difference between the sensing signal sen and the reference signal ref due to the feedback, so that the least significant bit of the digital data always varies. Compensating for the variation may employ a method utilized in an analog-to-digital converter of the conventional delta modulator type, so that a detailed description thereof will be skipped herein.

Figure 15:
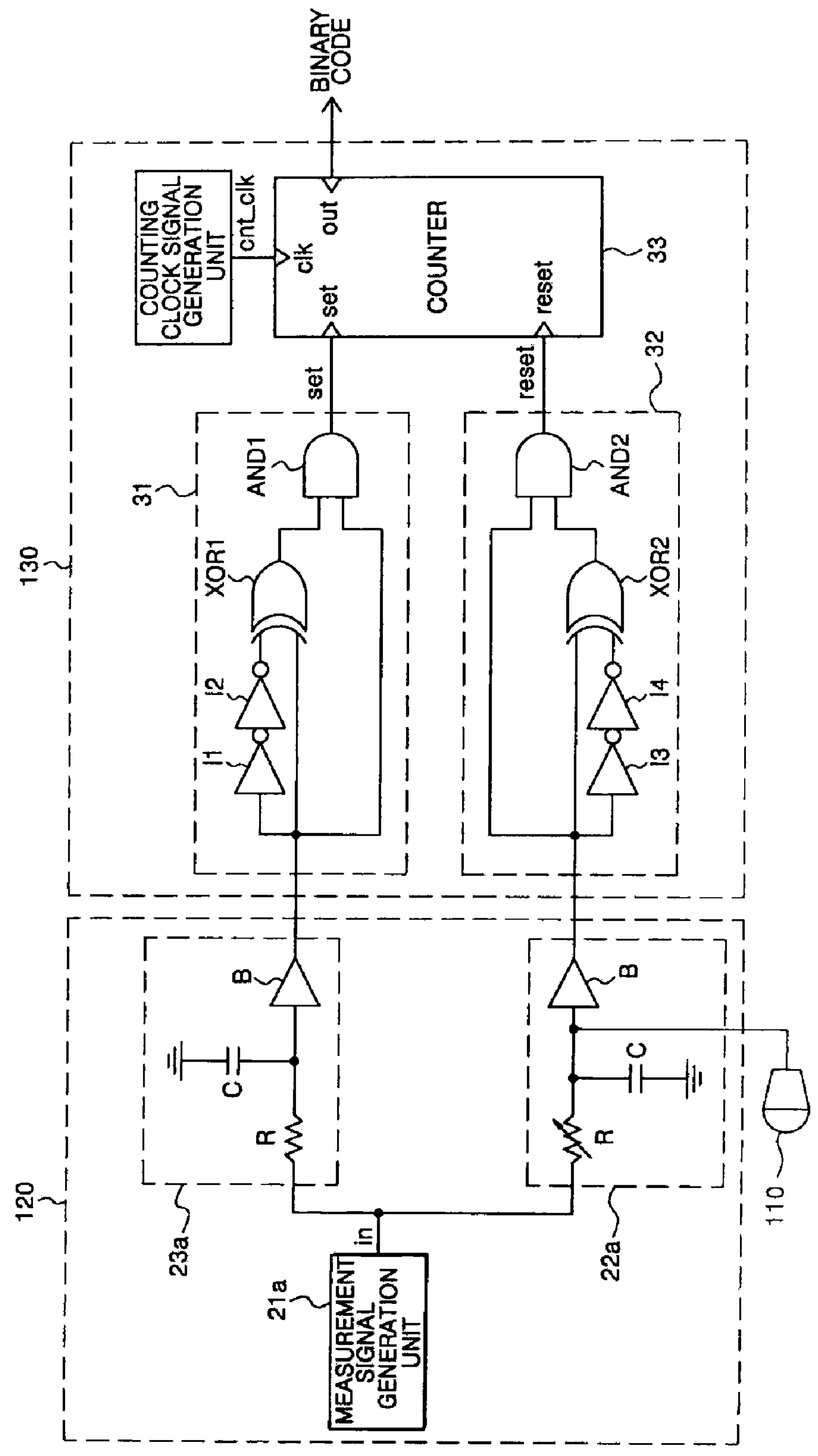
FIG. 15 illustrates the configuration of a microphone circuit implemented using a time-to-digital converting circuit in accordance with an embodiment of the present invention.

FIG. 15 illustrates the configuration of a microphone circuit implemented using the time-to-digital converting circuit in accordance with an embodiment of the present invention. In this case, the sensor 110 has a characteristic that it varies the electrostatic capacitance depending on sound pressure generated by an external tone generator, so that the time-to-digital circuit of FIG. 15 has the delay time-varying unit 120 implemented as the delay time-varying unit 70*a* of FIG. 4, and has the delay time calculation and data generation unit 130 implemented as the delay time calculation and data generation unit 40*a* of FIG. 8.

It is also clear that the delay time calculation and data generation unit 40*a* of FIG. 8 may be replaced by the delay time calculation and data generation unit 40*b* of FIG. 10.

Accordingly, as described with reference to FIG. 4, when the sensor 110 varies the electrostatic capacitance depending on the sound pressure generated by the external tone generator, the delay time-varying unit 120 of FIG. 15 generates the reference signal ref and the sensing signal sen having a predetermined delay time difference therebetween through the variable delay unit 72*a* and the fixable delay unit 73*a*.

The delay time calculation and data generation unit 130 then generates the counting start signal start and the counting end signal end having a predetermined delay time difference therebetween through a set signal generation unit 42 and a reset signal generation unit 41, and calculates the number of the counting clock signals cnt_clk generated during the time difference between the generated counting start signal start and the generated counting end signal end to thereby generate a binary code.

As such, the microphone circuit of FIG. 15 generates the digital data having a value corresponding to the sound pressure generated by the external tone generator as in the described microphone circuit of FIG. 2, however, varies the delay time of the sensing signal depending on the sound pressure of the tone generator and calculates the varied delay time to generate the digital data, so that a separate voltage generation unit for generating a separate high voltage is not required.

Accordingly, the microphone circuit of FIG. 15 does not require the analog circuit like the separate voltage generation unit for generating a voltage, so that a size of the microphone circuit may be significantly reduced. Furthermore, the microphone circuit of the present invention allows the sensor to be implemented only with an element varying the electrostatic capacitance depending on the external stimulus strength, so that the effect of reducing the size of the microphone circuit may be more enhanced.

Although not described above, embodiments of the time-to-digital converting circuit of FIG. 3 and embodiments of the time-to-digital converting circuit of FIG. 10 may be combined together if necessary to implement another time-to-digital converting circuit of the present invention.

For example, the variable delay unit 72 and the fixable delay unit 73 of FIG. 13 may be combined with the delay time calculation and data generation unit 40*a* of FIG. 8 or the delay time calculation and data generation unit 40*a* of FIG. 10 to implement a circuit generating the digital data corresponding to the output voltage of the sensor 50.

Alternatively, the variable delay unit 32*a* and the fixable delay unit 33*a* of FIG. 4 may be combined with the variable delay chain VCD, the fixable delay chain FDC, and the delay time calculation and data generation unit 80 of FIG. 13 to implement a circuit generating the digital data corresponding to the impedance of the sensor 10.

That is, although not described above, the variable delay unit, the fixable delay unit, and the delay time calculation and data generation unit according to the embodiments of the present invention may be combined in a various way in actual use.

Figure 16:
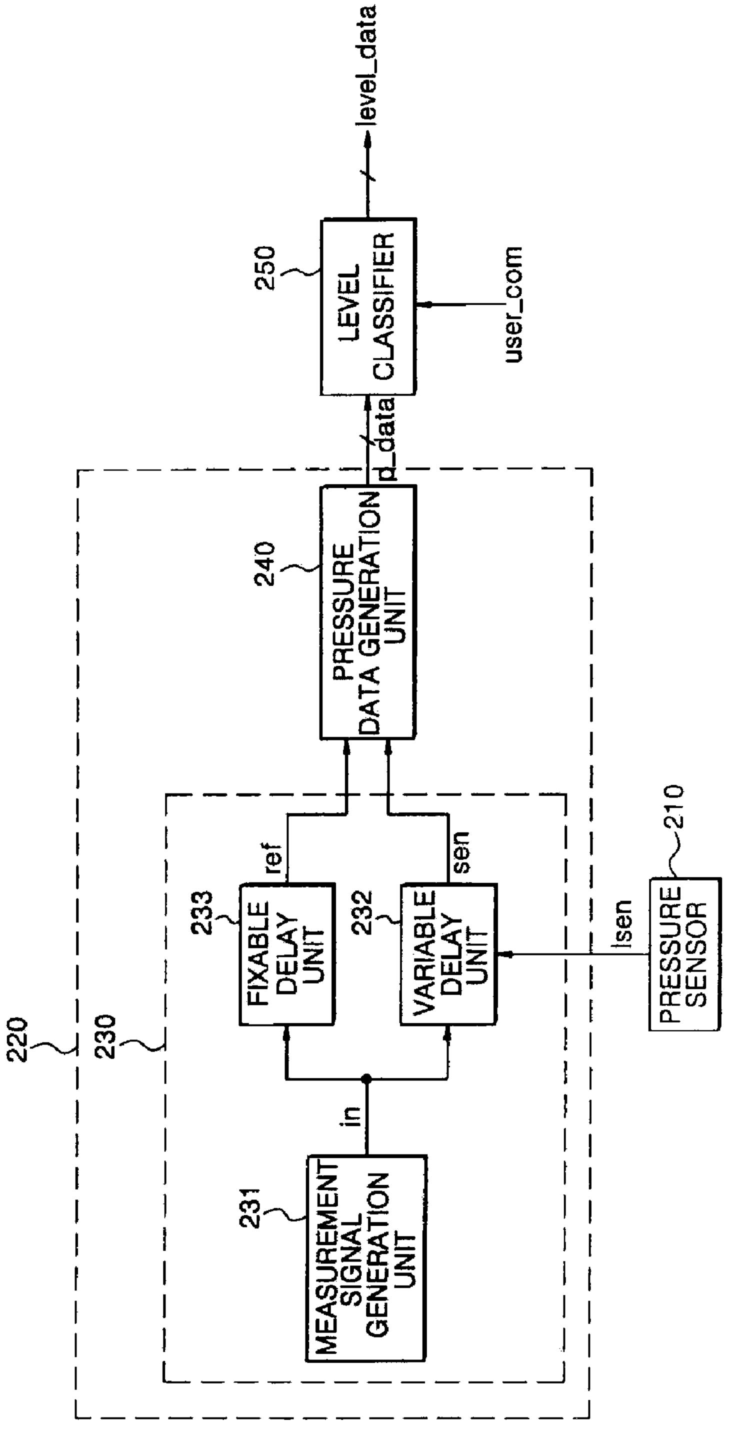
FIG. 16 illustrates the configuration of a pressure sensing device using a time-to-digital converting circuit in accordance with another embodiment of the present invention.

FIG. 16 illustrates the configuration of a pressure sensing device using a time-to-digital converting circuit in accordance with another embodiment of the present invention.

The conventional pressure sensing device may generally include a mechanical type pressure sensing device, an electric type pressure sensing device, and a semiconductor type pressure sensing device. However, such pressure sensing devices are not generalized in terms of accuracy and magnitude of the pressure so that they are classified and utilized in accordance with respective uses, and as the usage field of the pressure sensing device gradually increases, the market requirements are also di-versified, so that research into development of the pressure sensing device having higher sensitivity and reliability is continuously done. To cope with such market requirements, a pressure sensing device composed of a time-to-digital converting circuit according to the present invention is proposed.

All kinds of elements having an impedance Isen varying in response to the strength of pressure applied from the external can be employed as the pressure sensor 210 as in the described sensor 10 of FIG. 3.

In this case, the variable impedance may be any one of electrostatic capacitance, resistance, and inductance, however, the configuration of a variable delay unit 230 is determined in accordance with the kind of the variable impedance.

Configurations of the variable delay unit 230 are described with reference to FIGS. 4, 5, and 6 when the variable impedances are the respective electrostatic capacitance, the resistance, and the inductance, so that the detailed description will be skipped herein.

The variable delay unit 232 variably delays a measurement signal in generated by a measurement signal generation unit 231 in response to a change in impedance Isen of the pressure sensor 210 to output a sensing signal sen. The sensing signal sen has a shorter delay time when the pressure is not applied thereto and has a longer delay time when the higher pressure is applied thereto.

A fixable delay unit 233 is configured to have the same delay time as the delay time of the sensing signal sen in the variable delay unit 232 when the pressure is not applied to the pressure sensor 210, and the fixable delay unit 233 has an impedance equal to the sum of the impedance Isen when the pressure is not applied to the pressure sensor 210 and the impedance of the variable delay unit 232.

A pressure data generation unit 240 is the same as the delay time calculation and data generation units 40*a* and 40*b* shown in FIGS. 8 and 10, respectively.

The pressure data generation unit 240 measures a delay time difference between a reference signal ref and the sensing signal sen to output a pressure data value p_data corresponding to the measured delay time difference. When the pressure is not applied to the pressure sensor 210, the delay times of the reference signal ref and the sensing signal sen are the same, so that the output value of the pressure data p_data is "0" and when the pressure is applied to the pressure sensor 210, the impedance Isen of the pressure sensor 210 increases to cause the delay time of the sensing signal sen to be longer, which in turn leads to the delay time difference so that the output value of the pressure data p_data is greater than "0".

In this case, the longer the period of the measurement signal in generated in the measurement signal generation unit 231 and the larger the width of the varied impedance Isen, the bigger pressure can be measured.

For the case that the pressure sensor 210 has a wide range or bipolarity characteristics by negative and positive pressure, the pressure data generator unit 240 produces digital data to make either vaiable delay unit 232 or fixable delay unit 233 programmable.

A level classifier 250 makes a level classifying pressure in a predetermined unit in response to a command user_com applied by a user, and analyzes pressure data p_data output from the pressure data generation unit 240 to output a corresponding level value level_data.

For example, in a case of the pressure data generation unit 240 having the con-figuration shown in FIG. 8, when the pressure data p_data output from the pressure data generation unit 240 is four bits of binary data, the output value ranges from "0000" to "1111" and the level classifier 250 outputs two bits of binary data, and when the pressure data p_data output from the pressure data generation unit 240 ranges from "0000" to "0011" the level data level_data output from the level classifier 250 is "00".

In the same way, the level value level_data output from the level classifier 250 is "01" when the pressure data p_data is output in a range of "0100" to "0111" is "10" when the pressure data p_data is output in a range of "1000" to "1011" and is "11" when the pressure data p_data is output in a range of "1100" to "1111".

The level classifier 250 may be applied to the case when the pressure data generation unit 240 has the configuration of FIG. 10, however, the binary code decoder 49 may also be replaced in the configuration of FIG. 10 to apply the level classifier 250.

In addition, the level classifier 250 can act to adjust the zero point of the measured pressure data p_data.

The level classifier 250, when receives the command user_com of the external user, receives as zero data zero_data the pressure data p_data generated in the pressure data generation unit 240 due to a delay time difference between the reference signal ref and the sensing signal sen, and stores it. The level classifier 250 then subtracts the already stored zero data zero_data from the pressure data p_data generated in the pressure data generation unit 240 to output the level data level_data.

The pressure data generation unit 240 receives the sensing signal sen and the reference signal ref to generate the pressure data p_data resulted from the delay time difference therebetween. And when the command of the user user_com is applied to the level classifier 250, the pressure data generation unit 240 outputs the pressure data p_data to the level classifier 250. When the pressure data p_data is applied to the level classifier 250, the level classifier 250 has a subtractor (not shown) and subtracts the zero data zero_data from the pressure data p_data to output the level data level_data when the stored zero data zero_data exists.

In general, the above-described zero data zero_data is stored as the pressure data p_data when the pressure is not applied to the pressure sensor 210. However, a weight of a container may be set as the zero data zero_data for measuring a weight or the like of an object contained in the container.

FIG. 17 illustrates the configuration of a contact and pressure sensing device using a time-to-digital converting circuit in accordance with yet another embodiment of the present invention.

A contact and pressure sensor 310 includes a first conductor, a first insulator, a second conductor, a second insulator, a third conductor, and a third insulator which are sequentially stacked. The first conductor senses an electrostatic capacitance of an object to be in contact with, the second conductor is connected to a ground voltage GND, and the third conductor transmits a variable impedance to a first variable delay unit 332. The first conductor is connected to a second variable delay unit 334 and acts to sense the electrostatic capacitance of the object to be in contact with, however, the second conductor disposed below and connected to the ground voltage GND and the third conductor connected to the first variable delay unit 332 have an elastic insulator interposed therebetween, so that the electrostatic capacitance changes due to the pressure, and this change in electrostatic capacitance is delivered to the first variable delay unit 332.

A measurement signal generation unit 331, a pressure data generation unit 340, and a pressure sensing unit 320 comprising, the first variable delay unit 332 and a first fixable delay unit 333 are the same as the measurement signal generation unit 231, the pressure data generation unit 240, the variable delay unit 232, and the fixable delay unit 233 of FIG. 16, respectively.

A contact sensing unit 321 has a second variable delay unit 334, a second fixable delay unit 335, and a contact signal generation unit 341, and the second variable delay unit 334 and the second fixable delay unit 335 have the configurations similar to the first variable delay unit 332 and the first fixable delay unit 333, respectively.

The second fixable delay unit 335 delays a measurement signal in to generate a second reference signal ref2.

The second variable delay unit 334 delays the measurement signal in shorter than the second reference signal ref2 to generate a second sensing signal sen2 when the contact does not exist on the contact and pressure sensor 310, and delays the measurement signal in longer than the second reference signal ref2 to generate the second sensing signal sen2 when the contact exists on the contact and pressure sensor 310.

The contact signal generation unit 341 is implemented as a D-FlipFlop, and receives the second sensing signal sen2 in synchronization with the second reference signal ref2 and determines whether the contact and pressure sensor 310 is in a contact state, thereby generating a contact signal t_data.

Accordingly, the contact sensing unit 321 can correctly determine whether an object is in contact with the contact sensing unit when the object has a capacity of accumulating predetermined charges even when the object does not have sufficient conductivity.

Consequently, the contact and pressure sensing device of FIG. 17 simultaneously recognizes contact and pressure using only one pressure sensor so that it can be effectively used as an electric scrolling and selection device.

FIGS. 18 to 21 illustrate application examples of the pressure sensing device of FIG. 16 and the contact and pressure sensing device of FIG. 17.

FIG. 18 illustrates an example of a pressure measurement apparatus using the pressure sensing device in accordance with the present invention.

A pressure sensing device 410 is the pressure sensing device shown in FIG. 16, and has a pressure sensor having a variable impedance in response to the externally applied pressure P to output pressure data p_data corresponding to the pressure P to a controller 420.

The controller 420 receives a user command user_com, and converts the pressure data p_data applied from the pressure sensing device 410 into a format designated by the user to output display data display_data to a display unit 430.

For example, when the user command user_com designates kilogram Kg as a weight unit among units designated in the controller, the controller 420 converts the data Kg corresponding to the pressure data p_data into the display data display_data to output it to the display unit 430.

The pressure sensing device in the pressure measurement apparatus of FIG. 18 set the unit designated by the controller, so that the level classifier 250 shown in FIG. 16 is omitted.

The display unit 430 receives the display data display_data from the controller 420 and displays it on a screen.

FIG. 19 illustrates a mouse as an example of the electric scrolling device using the pressure sensing device of FIG. 16.

An input unit 510 transmits movement information of the mouse to a controller 520. Two pressure sensors 521 and 522 are disposed to scroll up and down and responding to pressure applied by a user so that the impedance varies. The controller 520 senses the movement information of the mouse, and changes in impedance of the two pressure sensors 521 and 522 to generate a signal for scrolling the screen of a connected computer using a direction and a speed corresponding to the impedance.

An interface 530 converts the signal output from the controller 520 to transmit in a format designated by the connected computer.

Accordingly, the conventional mechanical wheel can be replaced by the mouse which can simply implement an electric scrolling function using two pressure sensing devices.

FIGS. 20 and 21 illustrate an electric scrolling and selection device using the contact and pressure sensing device of FIG. 17 which is applied to a personal digital assistant or an MP3 player.

A plurality of contact and pressure sensors are disposed in a predetermined pattern to act as the scrolling and selection device. That is, when pressure is applied to a specific location of the contact and pressure sensor by a user, a display screen or a pointer of the display screen is configured to move, and the higher the pressure, the faster the movement. In addition, it can be used as a location selection device for recognizing the contact and selecting a specific item displayed on the screen.

A plurality of contact pads are required in each direction in order to sense a movement direction and a speed of the screen when the conventional contact sensor is used, however, the contact and pressure sensor of the present invention senses not only the contact but also the pressure, so that the movement direction and speed of the screen can be sensed even if only one contact and pressure sensor is disposed in each direction, thereby having superior space utilization.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

The invention claimed is:

1. A time-to-digital converting circuit, comprising:

a delay time-varying unit generating a reference signal having a programmably fixed delay time, and a sensing signal having a variable delay time in response to an impedance of an externally applied signal; and a delay time calculation and data generation unit calculating a delay time difference between the reference signal and the sensing signal, and generating digital data having a value corresponding to the calculated delay time difference.

2. The time-to-digital converting circuit according to claim 1, wherein the impedance of the externally applied signal is one of an electrostatic capacitance, a resistance, and an inductance.

3. The time-to-digital converting circuit according to claim 1, wherein the delay time-varying unit comprises:

a measurement signal generation unit generating a measurement signal;

a fixable delay unit delaying the measurement signal by a predetermined time to generate the reference signal; and a variable delay unit varying the delay time in response to the impedance of the externally applied signal, and delaying the measurement signal in response to the varied delay time to generate the sensing signal.

4. The time-to-digital converting circuit according to claim 3, wherein the delay time calculation and data generation unit comprises:

a control signal generation unit generating a counting start signal to be clocked in response to a first state of the reference signal, and a counting end signal to be clocked in response to a first state of the sensing signal;

a clock signal generation unit generating a clock signal; and a counter starting to calculate the number of the clock signals in response to the counting start signal, and generating digital data having a value corresponding to the calculated number of the clock signals in response to the counting end signal.

5. The time-to-digital converting circuit according to claim 4, wherein the control signal generation unit comprises:

a counting start signal generation unit generating the counting start signal to be clocked in response to the first state of the reference signal; and a counting end signal generation unit generating the counting end signal to be clocked in response to the first state of the sensing signal.

6. The time-to-digital converting circuit according to claim 5, wherein the counting start signal generation unit comprises:

first inverters delaying the reference signal;

a first logic gate performing an XOR operation on the reference signal and an output signal of the first inverters to generate a signal to be clocked in response to first and second states of the reference signal; and a second logic gate performing an AND operation on the reference signal and an output signal of the first logic gate to generate the counting start signal to be clocked in response to the first state of the reference signal.

7. The time-to-digital converting circuit according to claim 5, wherein the counting end signal generation unit comprises:

second inverters delaying the sensing signal;

a third logic gate performing an XOR operation on the sensing signal and an output signal of the second inverters to generate a signal to be clocked in response to first and second states of the sensing signal; and a fourth logic gate performing an AND operation on the sensing signal and an output signal of the third logic gate to generate the counting end signal to be clocked in response to the first state of the sensing signal.

8. The time-to-digital converting circuit according to claim 3, wherein the delay time calculation and data generation unit comprises:

a control signal generation unit generating a read signal to be clocked in response to a second state of the reference signal, and a reset signal to be clocked in response to a second state of the sensing signal;

a delay signal generation unit delaying the reference signal by different times from each other to generate delay signals having different delay times from each other; and a digital data generation unit latching the sensing signal in response to the delayed signals, and decoding the latched sensing signals to generate digital data.

9. The time-to-digital converting circuit according to claim 8, wherein the control signal generation unit comprises:

a read signal generation unit generating the read signal to be clocked in response to the second state of the reference signal; and a reset signal generation unit generating the reset signal to be clocked in response to the second state of the sensing signal.

10. The time-to-digital converting circuit according to claim 9, wherein the read signal generation unit comprises:

an odd number of inverters inverting the reference signal;

an even number of inverters delaying the sensing signal; and a fifth logic gate performing an AND operation on the inverted reference signal and the delayed sensing signal to generate the read signal to be clocked in response to the second state of the reference signal.

11. The time-to-digital converting circuit according to claim 9, wherein the reset signal generation unit comprises:

second inverters delaying the sensing signal;

a sixth logic gate performing an XOR operation on the sensing signal and an output signal of the second inverters to generate a signal to be clocked in response to the first and second states of the sensing signal; and a seventh logic gate performing an AND operation on the output signal of the second inverters and an output signal of the sixth logic gate to generate the reset signal to be clocked in response to the second state of the sensing signal.

12. The time-to-digital converting circuit according to claim 9, wherein the delay signal generation unit comprises a plurality of serially connected delay units.

13. The time-to-digital converting circuit according to claim 8, wherein the digital data generation unit comprises:

a thermometer code generation unit latching the sensing signal in response to each of the delay signals, and outputting the latched sensing signals in response to the read signal to generate a thermometer code; and a code converting unit converting the thermometer code to a binary code, and outputting the binary code as the digital data.

14. The time-to-digital converting circuit according to claim 13, wherein the thermometer code generation unit comprises:

a plurality of latch circuits latching the sensing signal in response to the respective delay signals to generate latch signals; and a plurality of eighth logic gates performing an AND operation on the read signal and the respective latch signals to generate the thermometer code.

15. The time-to-digital converting circuit according to claim 1, wherein the delay time-varying unit comprises:

a measurement signal generation unit generating a measurement signal;

a fixable delay unit delaying the measurement signal by a predetermined time to generate the reference signal; and a variable delay unit varying the delay time in response to the impedance of the externally applied signal and a digital data value fed back from the delay time calculation and data generation unit, and delaying the measurement signal in response to the varied delay time to generate the sensing signal.

16. The time-to-digital converting circuit according to claim 15, wherein the variable delay unit comprises:

a first delay unit varying the delay time in response to the impedance of the externally applied signal; and a second delay unit receiving the digital data fed back from the delay time calculation and data generation unit to vary the delay time, and delaying an output signal of the first delay unit in response to the varied delay time to generate the sensing signal.

17. The time-to-digital converting circuit according to claim 16, wherein the second delay unit comprises a plurality of serially connected delay units, and the number of the delay units each performing a delay operation on the output signal of the first delay unit decreases when an amount of digital data fed back increases, and increases when the amount decreases.

18. The time-to-digital converting circuit according to claim 15, wherein the delay time calculation and data generation unit comprises:

a latch circuit latching the sensing signal in response to the reference signal; and a counter circuit sequentially increasing and decreasing the value of the digital data while feeding the digital data back to the variable delay unit, and obtaining and outputting the value of the digital data at the time that an output signal of the latch circuit varies from a first level to a second level.

19. A time-to-digital converting circuit, comprising:

a delay time-varying unit generating a reference signal having a programmably fixed delay time, and a sensing signal having a variable delay time in response to a voltage of an externally applied signal; and a delay time calculation and data generation unit calculating a delay time difference between the reference signal and the sensing signal, and generating digital data having a value corresponding to the calculated delay time difference.

20. The time-to-digital converting circuit according to claim 19, wherein the delay time-varying unit comprises:

a measurement signal generation unit generating a measurement signal;

a fixable delay unit delaying the measurement signal by a predetermined time to generate the reference signal; and a variable delay unit varying a delay time in response to the voltage of the externally applied signal and the digital data fed back from the delay time calculation and data generation unit, and delaying the measurement signal in response to the varied delay time to generate the sensing signal.

21. The time-to-digital converting circuit according to claim 20, wherein the fixable delay unit comprises:

a first charge unit charging and discharging the measurement signal;

a first signal generation unit generating a signal having a logical value corresponding to a voltage of the first charge unit; and a first delay unit delaying an output signal of the first signal generation unit by a predetermined time to generate the reference signal.

22. The time-to-digital converting circuit according to claim 21, wherein the variable delay unit comprises:

a second charge unit charging and discharging the measurement signal and the externally applied signal;

a switch delivering the externally applied signal to the second charge unit in response to an output signal of the first signal generation unit;

a second signal generation unit generating a signal having a logical value corresponding to a voltage of the second charge unit; and a second delay unit varying a delay time in response to the digital data fed back from the delay time calculation and data generation unit, and delaying an output signal of the second signal generation unit in response to the varied delay time to generate the sensing signal.

23. The time-to-digital converting circuit according to claim 22, wherein the second delay unit comprises a plurality of serially connected delay units, and the number of the delay units each performing a delay operation on the output signal of the second delay unit decreases when an amount of digital data fed back increases, and increases when the amount decreases.

24. The time-to-digital converting circuit according to claim 20, wherein the delay time calculation and data generation unit comprises:

a latch circuit latching the sensing signal in response to the reference signal; and a counter circuit sequentially increasing and decreasing the value of the digital data while feeding the digital data back to the variable delay unit, and obtaining and outputting the value of the digital data at the time that an output signal of the latch circuit varies from a first level to a second level.

25. The time-to-digital converting circuit according to claim 24, wherein the counter circuit comprises an up-down counter sequentially decreasing the value of the digital data when the output signal of the latch circuit has the first level and sequentially increasing the value of the digital data when the output signal of the latch circuit has the second level.

26. The time-to-digital converting circuit according to claim 19, wherein the delay time-varying unit comprises:

a measurement signal generation unit generating a measurement signal;

a fixable delay unit delaying the measurement signal by a predetermined time to generate the reference signal; and a variable delay unit varying a delay time in response to the voltage of the externally applied signal, and delaying the measurement signal in response to the varied delay time to generate the sensing signal.

27. The time-to-digital converting circuit according to claim 26, wherein the fixable delay unit comprises:

a first charge unit charging and discharging the measurement signal; and a first signal generation unit generating the reference signal having a logical value corresponding to a voltage of the first charge unit.

28. The time-to-digital converting circuit according to claim 26, wherein the variable delay unit comprises:

a second charge unit charging and discharging the measurement signal and the externally applied signal;

a switch delivering the externally applied signal to the second charge unit in response to the reference signal; and a second signal generation unit generating the sensing signal having a logical value corresponding to a voltage of the second charge unit.

29. The time-to-digital converting circuit according to claim 26, wherein the delay time calculation and data generation unit comprises:

a control signal generation unit generating a counting start signal to be clocked in response to a first state of the reference signal, and a counting end signal to be clocked in response to a first state of the sensing signal;

a clock signal generation unit generating a clock signal; and a counter starting to calculate the number of the clock signals in response to the counting start signal, and generating digital data having a value corresponding to the calculated number of the clock signals in response to the counting end signal.

30. The time-to-digital converting circuit according to claim 26, wherein the delay time calculation and data generation unit comprises:

a control signal generation unit generating a read signal to be clocked in response to a second state of the reference signal, and a reset signal to be clocked in response to a second state of the sensing signal;

a delay signal generation unit delaying the reference signal by different times from each other to generate delay signals having different delay times from each other; and a digital data generation unit latching the sensing signal in response to the delayed signals, and decoding the latched sensing signals to generate digital data.

31. The time-to-digital converting circuit according to claim 30, wherein the digital data generation unit comprises:

a thermometer code generation unit latching the sensing signal in response to each of the delay signals, and outputting the latched sensing signals in response to the read signal to generate a thermometer code; and a code converting unit converting the thermometer code to a binary code, and outputting the binary code as the digital data.

* * * * *